US012648021B2

(12) United States Patent
Baek et al.

(10) Patent No.: US 12,648,021 B2
(45) Date of Patent: Jun. 2, 2026

(54) RESTRICTED TWT OPERATION WHICH HAS BEEN IMPROVED

(71) Applicant: LG ELECTRONICS INC., Seoul (KR)

(72) Inventors: Sunhee Baek, Seoul (KR); Jinsoo Choi, Seoul (KR); Jeongki Kim, Seoul (KR); Namyeong Kim, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 18/034,658

(22) PCT Filed: Nov. 11, 2021

(86) PCT No.: PCT/KR2021/016432
§ 371 (c)(1),
(2) Date: Apr. 28, 2023

(87) PCT Pub. No.: WO2022/103169
PCT Pub. Date: May 19, 2022

(65) Prior Publication Data
US 2023/0403739 A1     Dec. 14, 2023

(30) Foreign Application Priority Data

Nov. 13, 2020    (KR) ........................ 10-2020-0152190
Dec. 28, 2020    (KR) ........................ 10-2020-0185014
(Continued)

(51) Int. Cl.
*H04W 74/0816*    (2024.01)
*H04W 74/08*    (2009.01)
*H04W 84/12*    (2009.01)

(52) U.S. Cl.
CPC ... *H04W 74/0816* (2013.01); *H04W 74/0875* (2013.01); *H04W 84/12* (2013.01)

(58) Field of Classification Search
CPC ......... H04W 74/0816; H04W 74/0875; H04W 84/12; H04W 74/0891; H04W 52/02;
(Continued)

(56) References Cited

U.S. PATENT DOCUMENTS

2017/0311258 A1    10/2017    Asterjadhi et al.
2021/0360646 A1*    11/2021    Chu ..................... H04W 72/569
(Continued)

FOREIGN PATENT DOCUMENTS

KR    1020200028208 A    3/2020
KR    1020200091886 A    7/2020
KR    1020200120598 A    10/2020

OTHER PUBLICATIONS

Hu et al., "Protected TWT Enhancement for Latency Sensitive Traffic", IEEE 802.11-20/1046r7, (Oct. 12, 2020).

*Primary Examiner* — Jutai Kao
*Assistant Examiner* — Syed M Bokhari
(74) *Attorney, Agent, or Firm* — BRYAN CAVE LEIGHTON PAISNER LLP

(57)     ABSTRACT

The present specification proposes a method for a restricted TWT operation which has been improved and an apparatus for using the method. Particularly, according to an embodiment of the present specification, only when a specific condition is satisfied, a restricted TWT operation may be performed. Also, according to an embodiment of the present specification, an STA may determine whether or not to maintain a TXOP in progress prior to the start of a restricted TWT SP. In addition, according to an embodiment of the present specification, when the TXOP in progress is main-
(Continued)

tained prior to the start of the restricted TWT SP, the restricted TWT SP may be delayed.

11 Claims, 24 Drawing Sheets

(30)　　　　　Foreign Application Priority Data

| | | |
|---|---|---|
| Jan. 26, 2021 | (KR) ........................ | 10-2021-0011007 |
| Mar. 12, 2021 | (KR) ........................ | 10-2021-0032815 |
| Mar. 19, 2021 | (KR) ........................ | 10-2021-0036154 |
| Apr. 23, 2021 | (KR) ........................ | 10-2021-0053197 |

(58) Field of Classification Search
　　CPC . H04W 52/0229; H04W 72/569; Y02D 30/70
　　USPC ......................................................... 370/329
　　See application file for complete search history.

(56)　　　　　References Cited

U.S. PATENT DOCUMENTS

| | | | |
|---|---|---|---|
| 2022/0070772 A1* | 3/2022 | Ho ................... | H04W 28/0268 |
| 2022/0078844 A1* | 3/2022 | Cherian .............. | H04W 74/08 |

* cited by examiner

FIG. 1
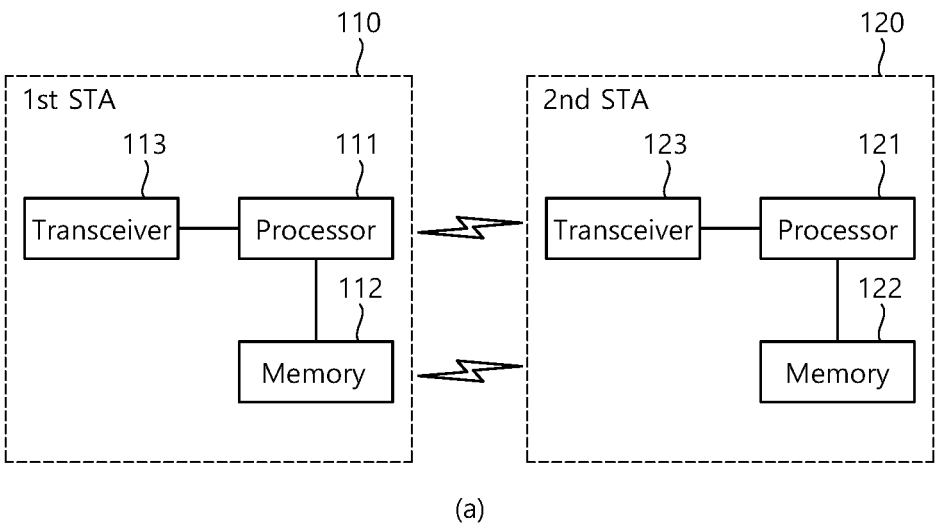
(a)
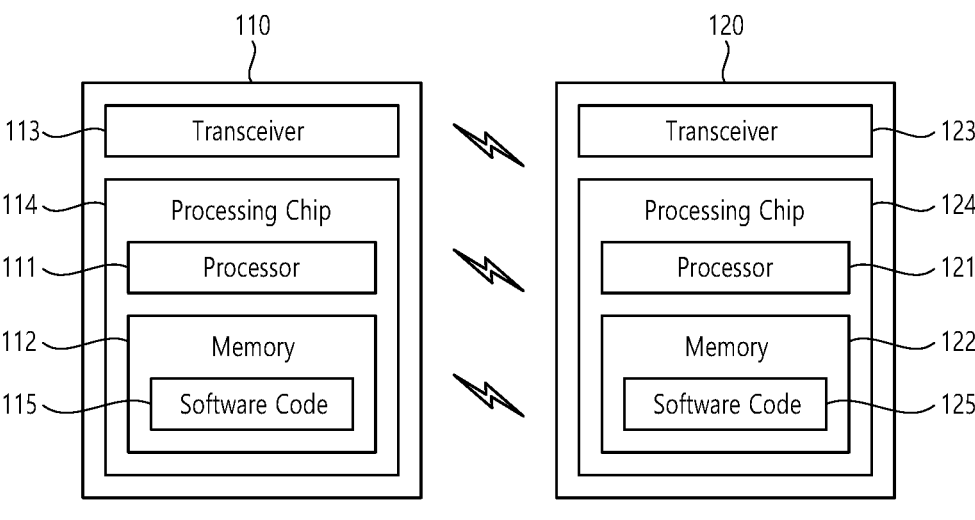
(b)

FIG. 2
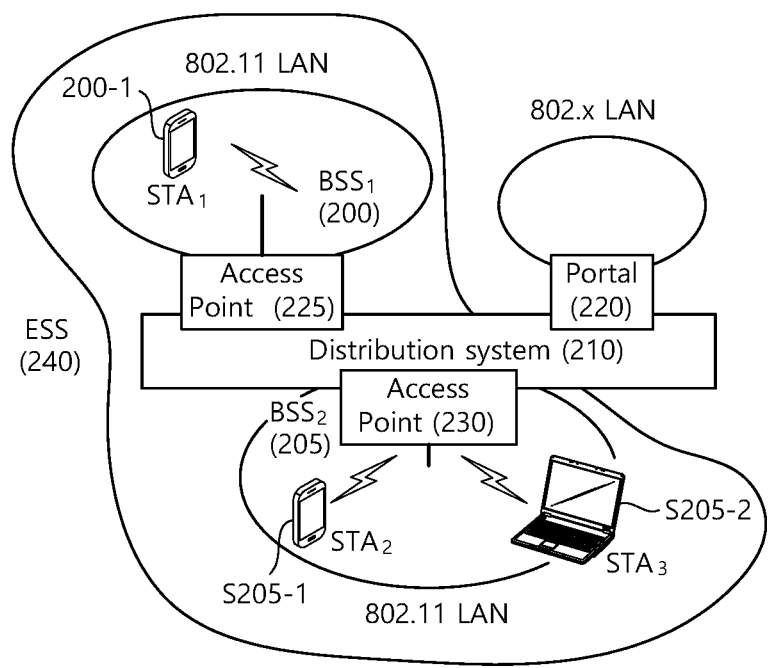
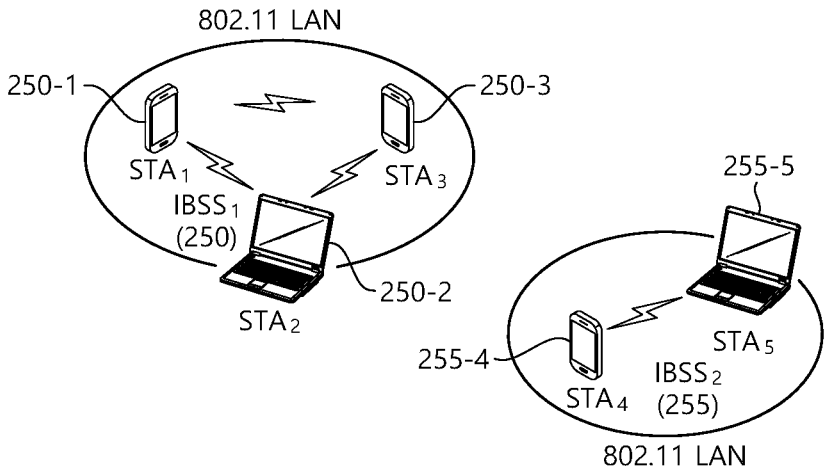

FIG. 4

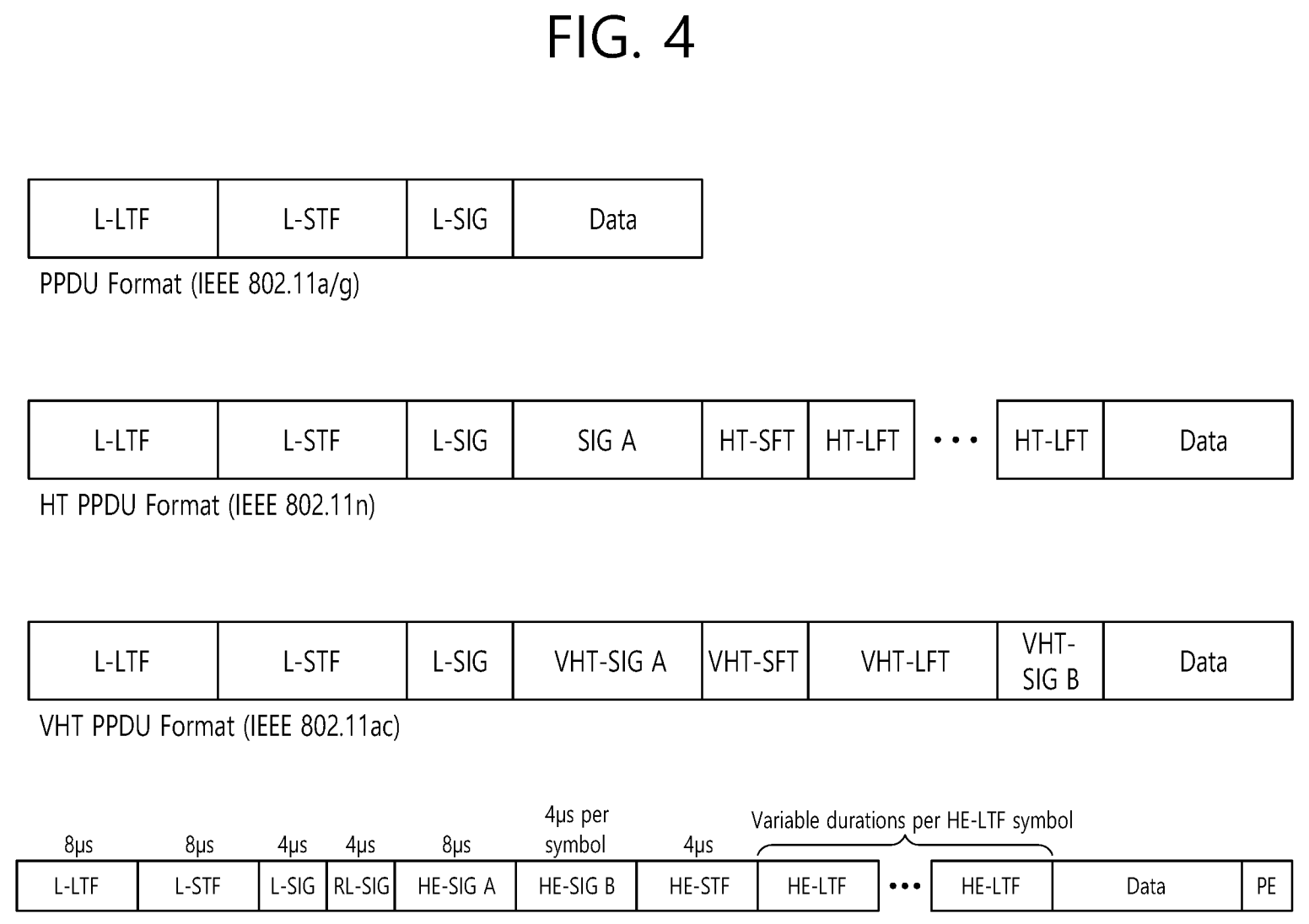

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ⋯ | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| L-LTF | L-STF | L-SIG | RL-SIG | HE-SIG A | HE-SIG B | HE-STF | HE-LTF | ⋯ | HE-LTF | Data | PE |
|---|---|---|---|---|---|---|---|---|---|---|---|

8µs · 8µs · 4µs · 4µs · 8µs · 4µs per symbol · 4µs

Variable durations per HE-LTF symbol

RU Allocation subfield $01000y_2\,y_1\,y_0 = 01000010$

| User field 1 | User field 2 | User field 3 | User field 4 | User field 5 | User field 6 | User field 7 | User field 8 |
|---|---|---|---|---|---|---|---|

MU-MIMO allocation

| RU assignment | 106-tone | 26-tone | 26-tone | 26-tone | 26-tone | 26-tone | 26-tone |
|---|---|---|---|---|---|---|---|
| Number of users per RU | 3 | 1 | 1 | 1 | 1 | 1 | 1 |

FIG. 10

| L-STF | L-LTF | L-SIG | RL-SIG | U-SIG | EHT-SIG | EHT-STF | EHT-LTF | Data |

<Negotiation Procedure>

FIG. 21

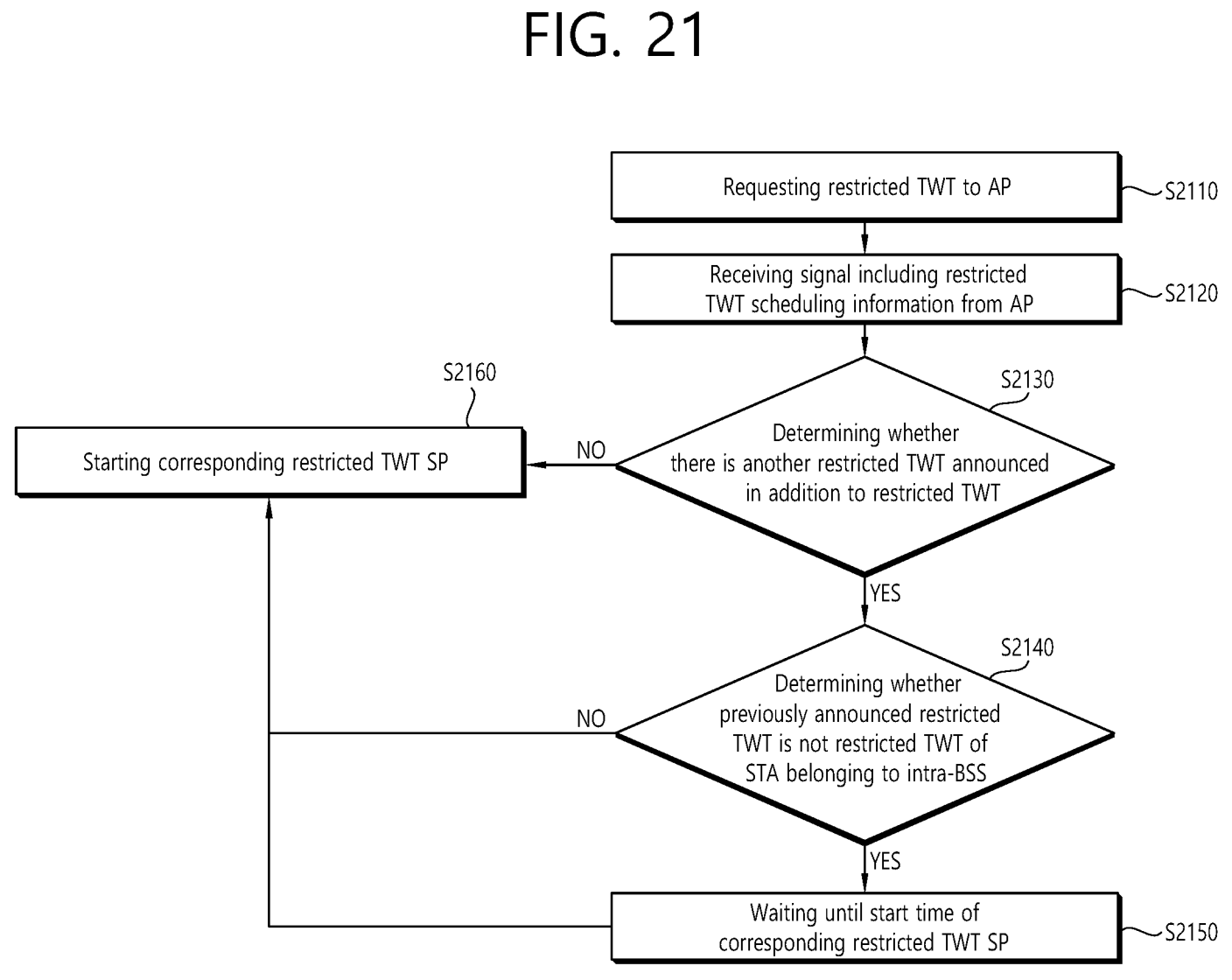

S2110 — Requesting restricted TWT to AP

S2120 — Receiving signal including restricted TWT scheduling information from AP S2130 — Determining whether there is another restricted TWT announced in addition to restricted TWT NO → S2160 — Starting corresponding restricted TWT SP YES → S2140 — Determining whether previously announced restricted TWT is not restricted TWT of STA belonging to intra-BSS NO → Starting corresponding restricted TWT SP YES → S2150 — Waiting until start time of corresponding restricted TWT SP Receiving signal including information restricted TWT from AP ~S2210

Transmitting data to AP in obtained TXOP ~S2220

RESTRICTED TWT OPERATION WHICH HAS BEEN IMPROVED

CROSS-REFERENCE TO RELATED APPLICATIONS

This application is the National Stage filing under 35 U.S.C. 371 of International Application No. PCT/KR2021/016432, filed on Nov. 11, 2021, which claims the benefit of Korean Patent Application No. 10-2020-0152190 filed on Nov. 13, 2020, Korean Patent Application No. 10-2020-0185014 filed on Dec. 28, 2020, Korean Patent Application No. 10-2021-0011007 filed on Jan. 26, 2021, Korean Patent Application No. 10-2021-0032815 filed on Mar. 12, 2021, Korean Patent Application No. 10-2021-0036154 filed on Mar. 19, 2021, and Korean Patent Application No. 10-2021-0053197 filed on Apr. 23, 2021, which are all hereby incorporated by reference herein in their entirety.

TECHNICAL FIELD

The present specification relates to a restricted TWT operation in a wireless LAN system.

BACKGROUND ART

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

As wired/wireless traffic has recently exploded, traffic sensitive to time delay has also increased significantly. Traffic that is sensitive to time delay is real-time audio/video transmission, and the need to support it in a wireless environment has increased along with the proliferation of multimedia devices. However, in a wireless environment rather than a wired environment, there are many considerations to support traffic sensitive to time delay. This is because transmission speed is lower than wired transmission and interference from surroundings also occurs.

In particular, since Wi-Fi is a communication system that should compete equally in the ISM band without channel monopolization by a central base station, it is relatively difficult to support traffic sensitive to time delay. However, as described above, since traffic sensitive to time delay is increasing recently, a Wi-Fi technology for supporting this is required. This specification proposes a technique for supporting traffic sensitive to time delay.

SUMMARY

The present specification proposes an improved restricted TWT operating method and an apparatus using the method. Specifically, according to an embodiment of the present specification, a restricted TWT operation may be performed only when a specific condition is satisfied. In addition, according to an embodiment of the present specification, the STA may determine whether to maintain the ongoing/in-progress TXOP before the start of the restricted TWT SP. In addition, according to an embodiment of the present specification, when the ongoing/in-progress TXOP is maintained before the start of the restricted TWT SP, the restricted TWT SP may be postponed.

According to the present specification, transmission and reception of data sensitive to latency, which may be restricted due to the configurations of the restricted TWT, can be guaranteed. Furthermore, it is possible to prevent a problem of collision between data.

BRIEF DESCRIPTION OF THE DRAWINGS

FIG. 1(a) and FIG. 1(b) show an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 10 illustrates an example of a PPDU used in the present specification.

FIG. 21 is a flow chart for an example of an operating method of the low-latency STA1 according to some implementations of the present specification when the AP, low-latency STA1 and low-latency STA2 are located in inter-BSS or OBSS.

DETAILED DESCRIPTION

Figure 3:
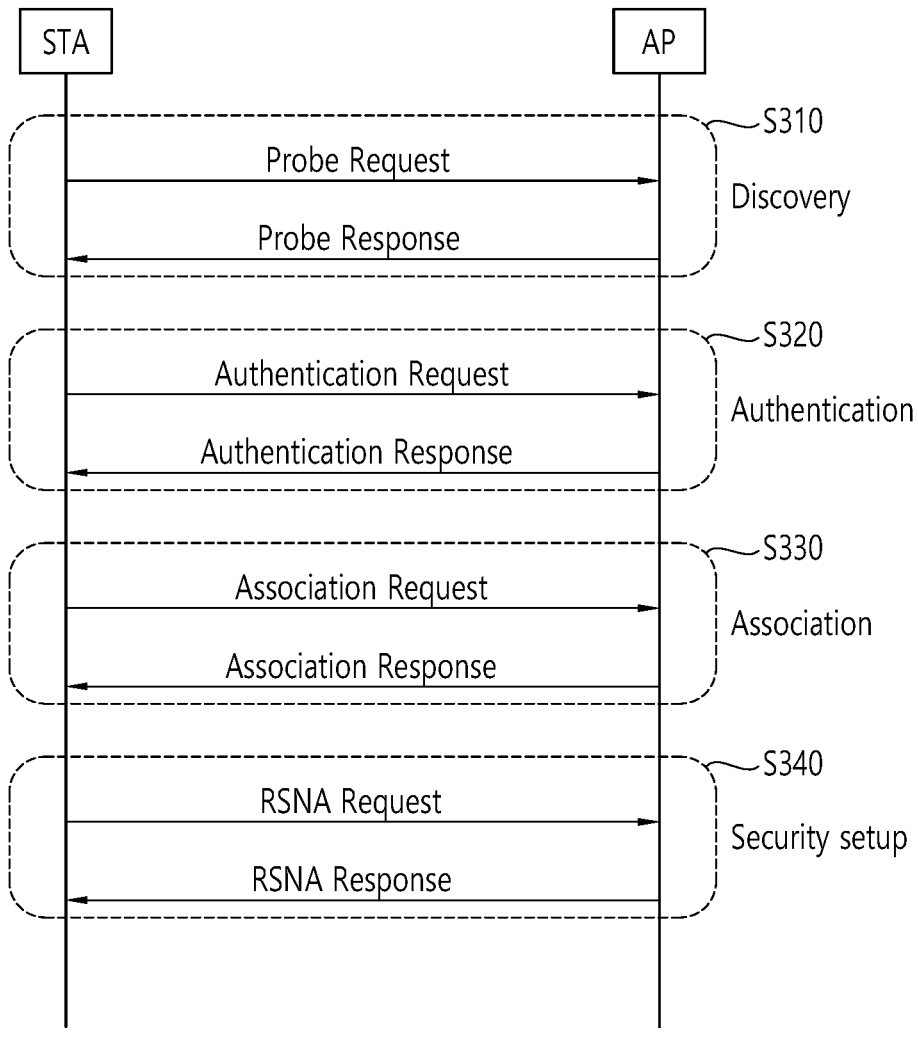
FIG. 3 illustrates a general link setup process.

In the present specification, "A or B" may mean "only A", "only B" or "both A and B". In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
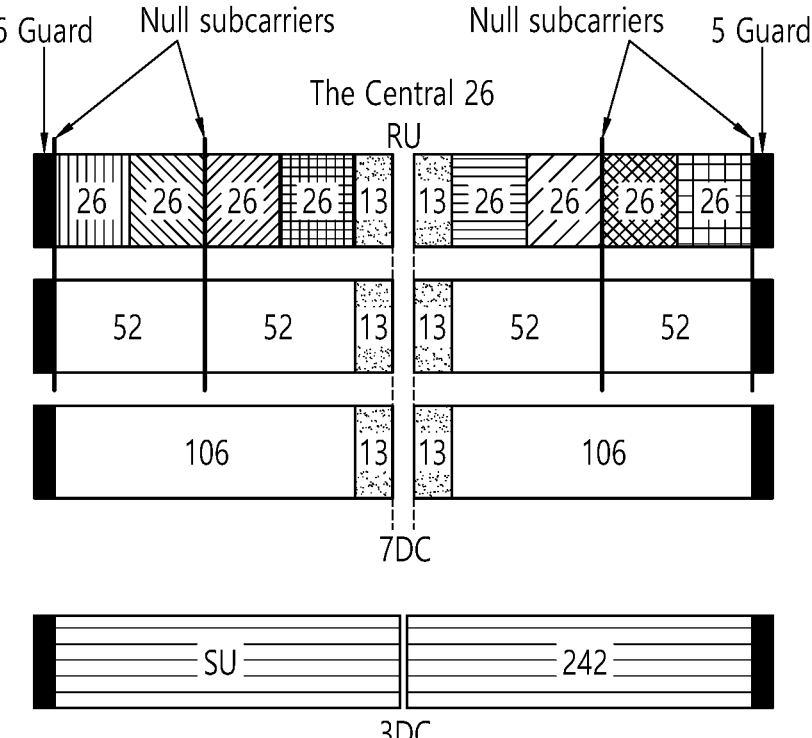
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
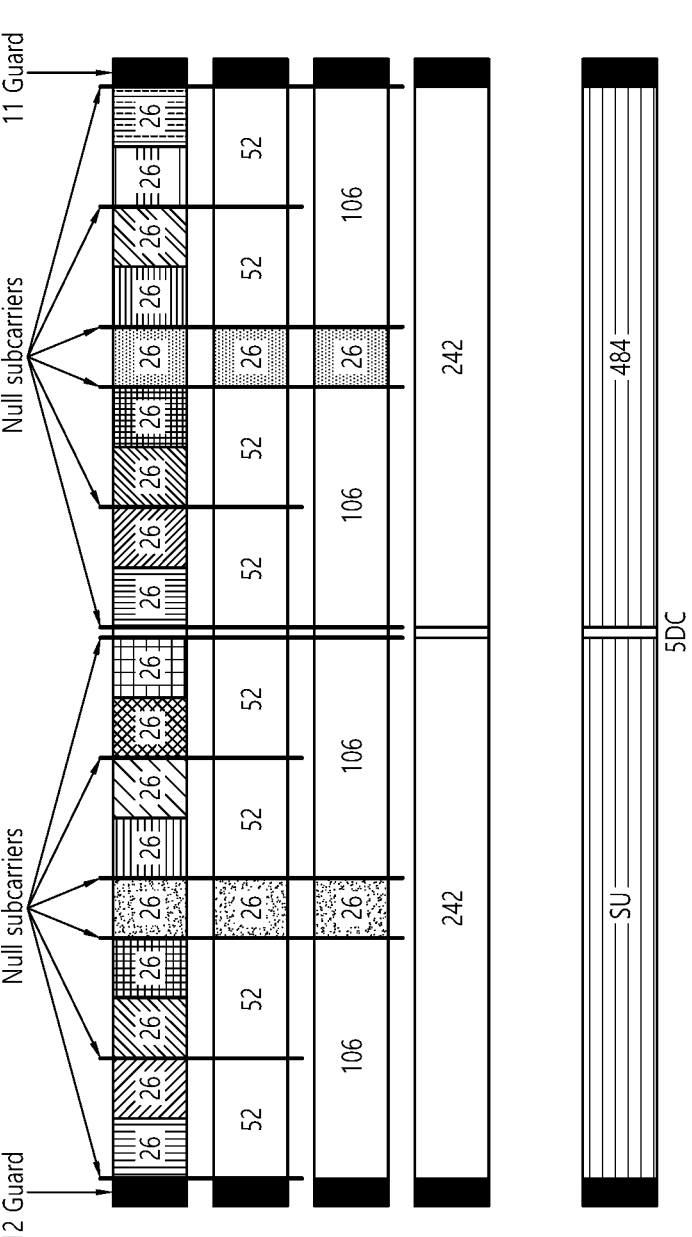
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
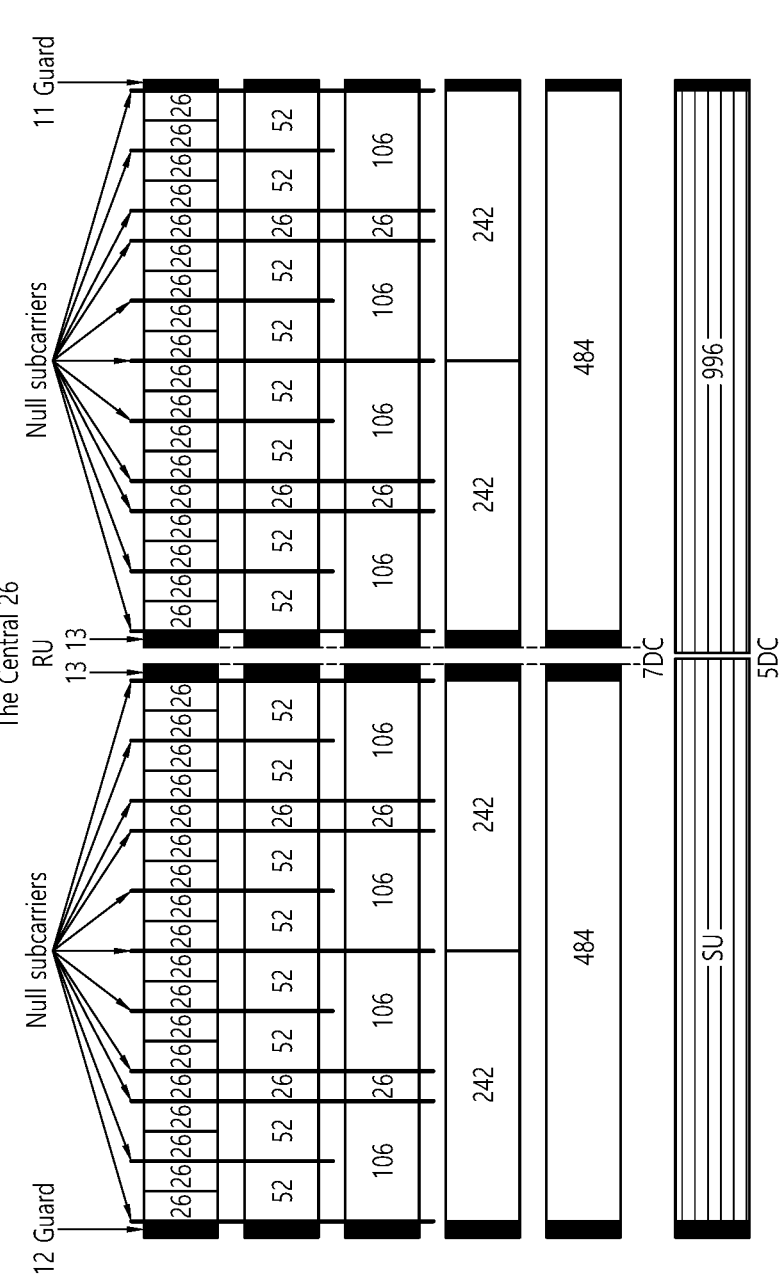
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
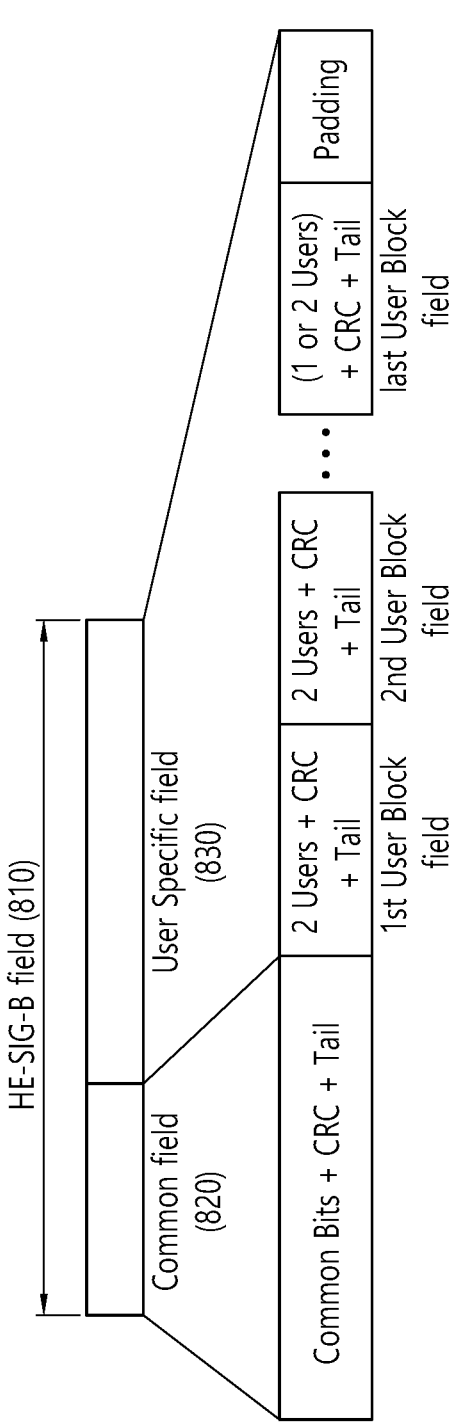
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 |  | 26 | 26 | 1 |
| 00000011 | 26 | 26 | 26 | 26 | 26 | 52 |  | 52 |  | 1 |
| 00000100 | 26 | 26 | 52 |  | 26 | 26 | 26 | 26 | 26 | 1 |
| 00000101 | 26 | 26 | 52 |  | 26 | 26 | 26 | 52 |  | 1 |
| 00000110 | 26 | 26 | 52 |  | 26 | 52 |  | 26 | 26 | 1 |
| 00000111 | 26 | 26 | 52 |  | 26 | 52 |  | 52 |  | 1 |
| 00001000 | 52 |  | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ |  | 106 |  |  | 26 | 26 | 26 | 26 | 26 | 8 |
| $01001y_2y_1y_0$ |  | 106 |  |  | 26 | 26 | 26 | 52 |  | 8 |

"$01000y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
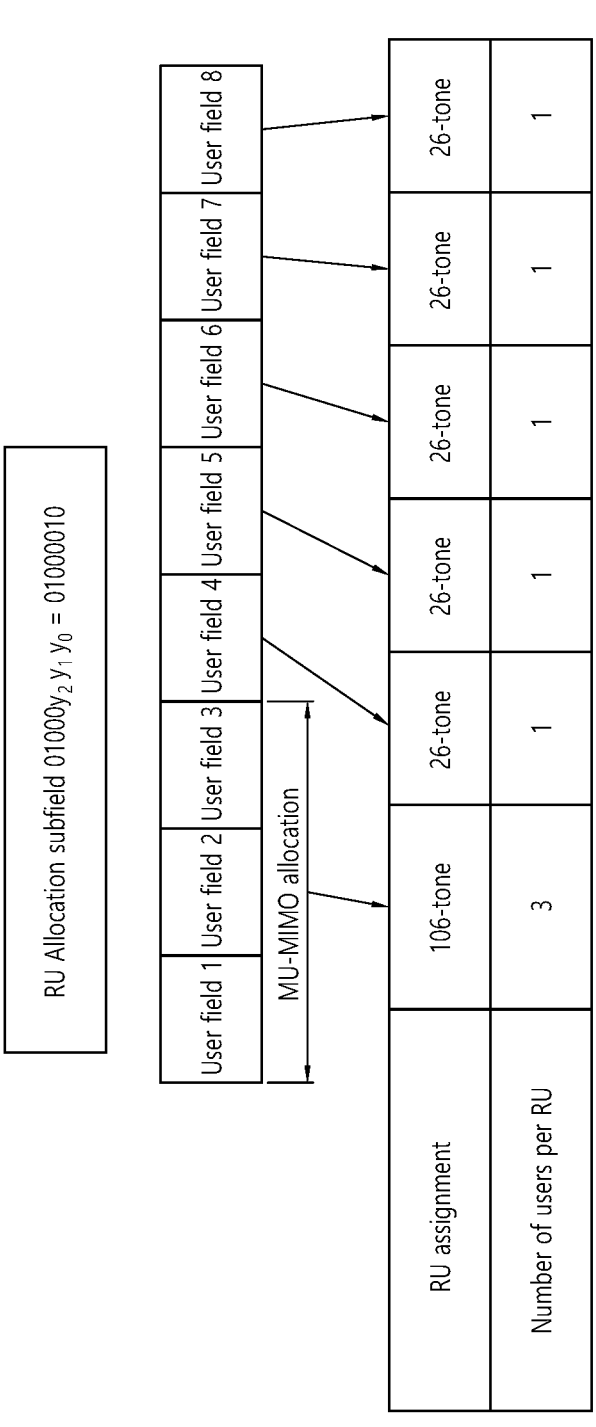
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS)

information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
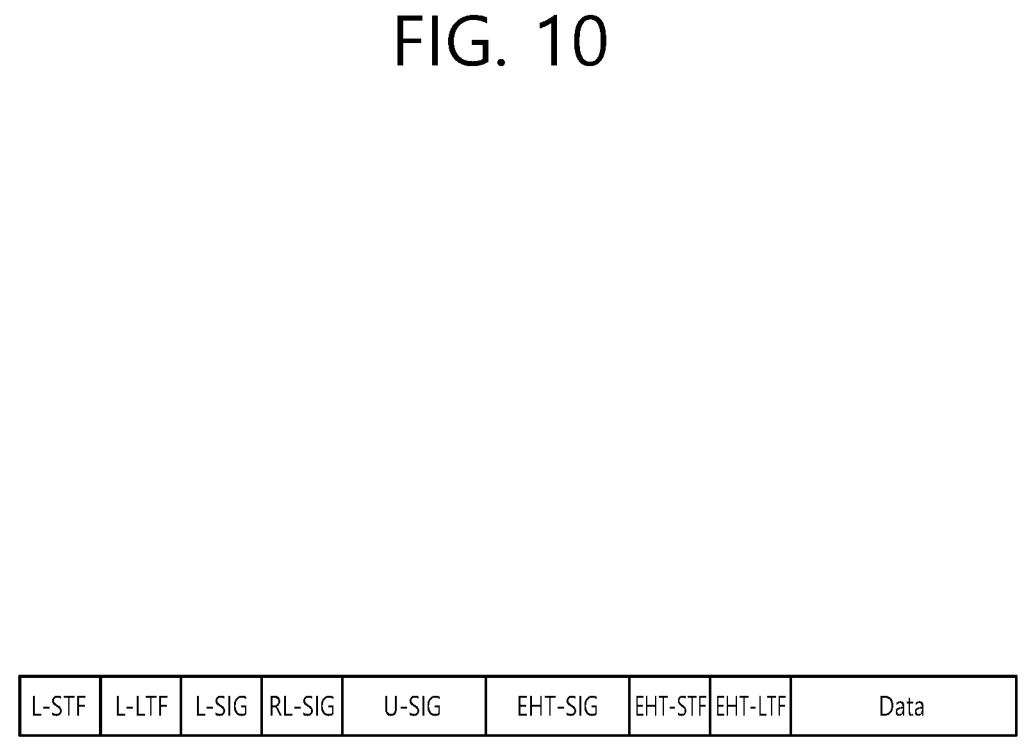

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of $R=\frac{1}{2}$ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM)

scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of contiguous tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
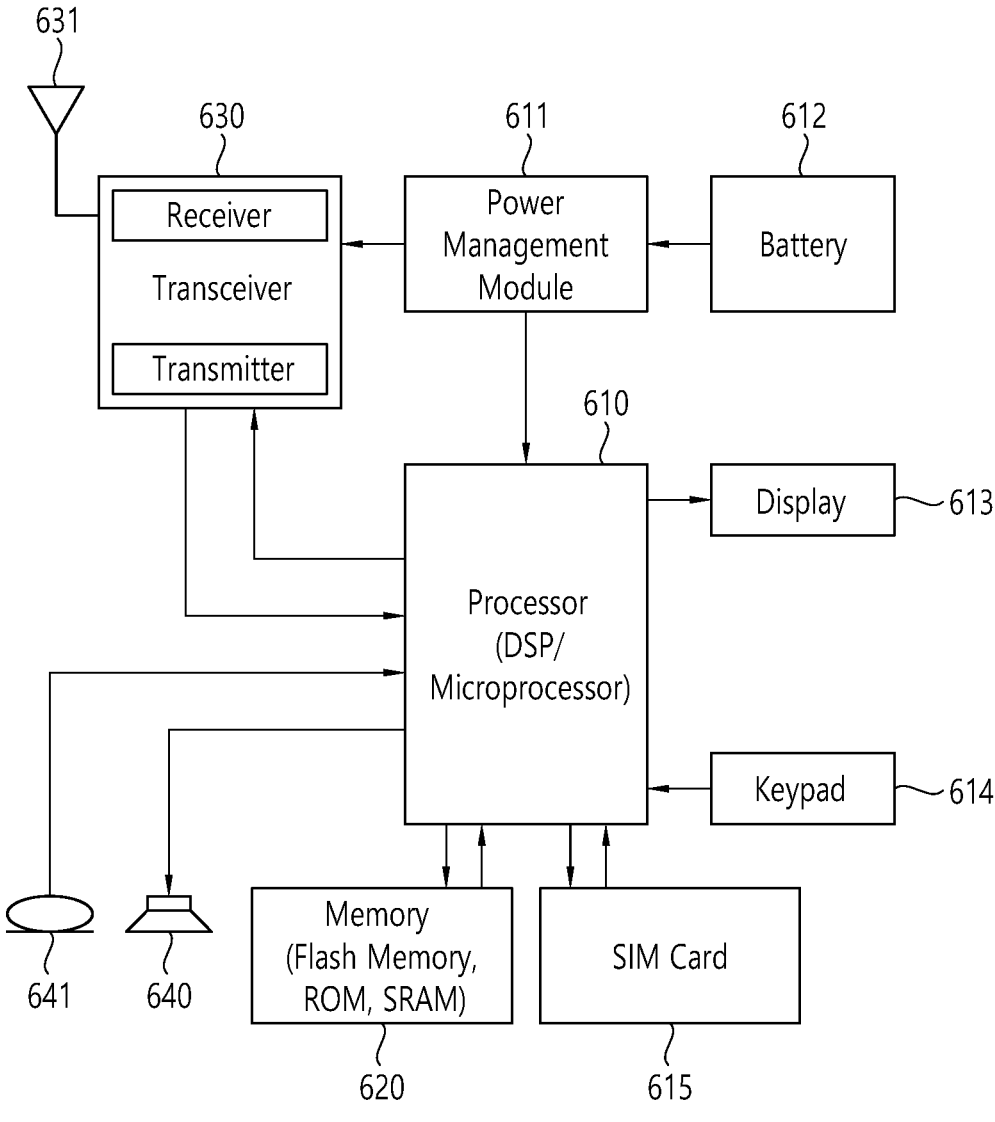
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Figure 12:
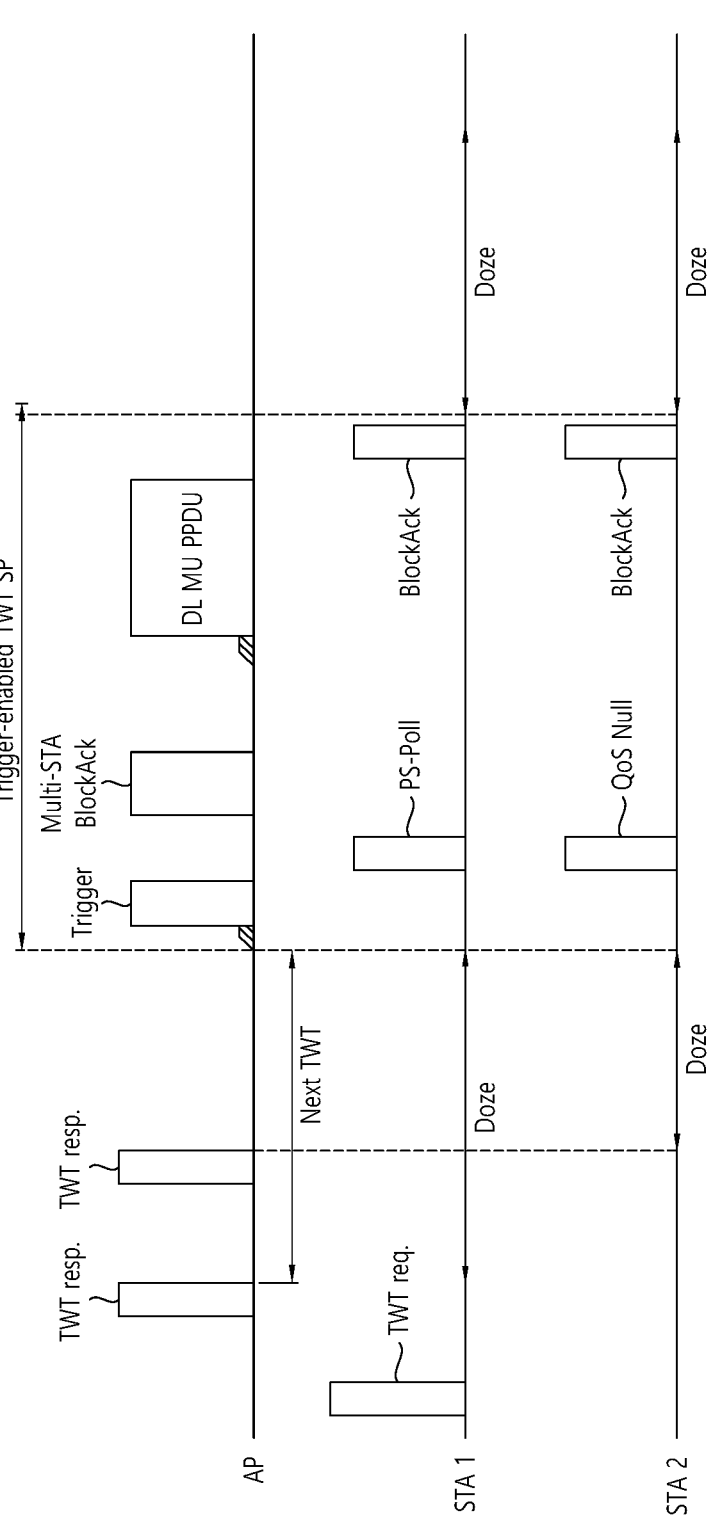
FIG. 12 shows an example of individual TWT operation.
Figure 13:
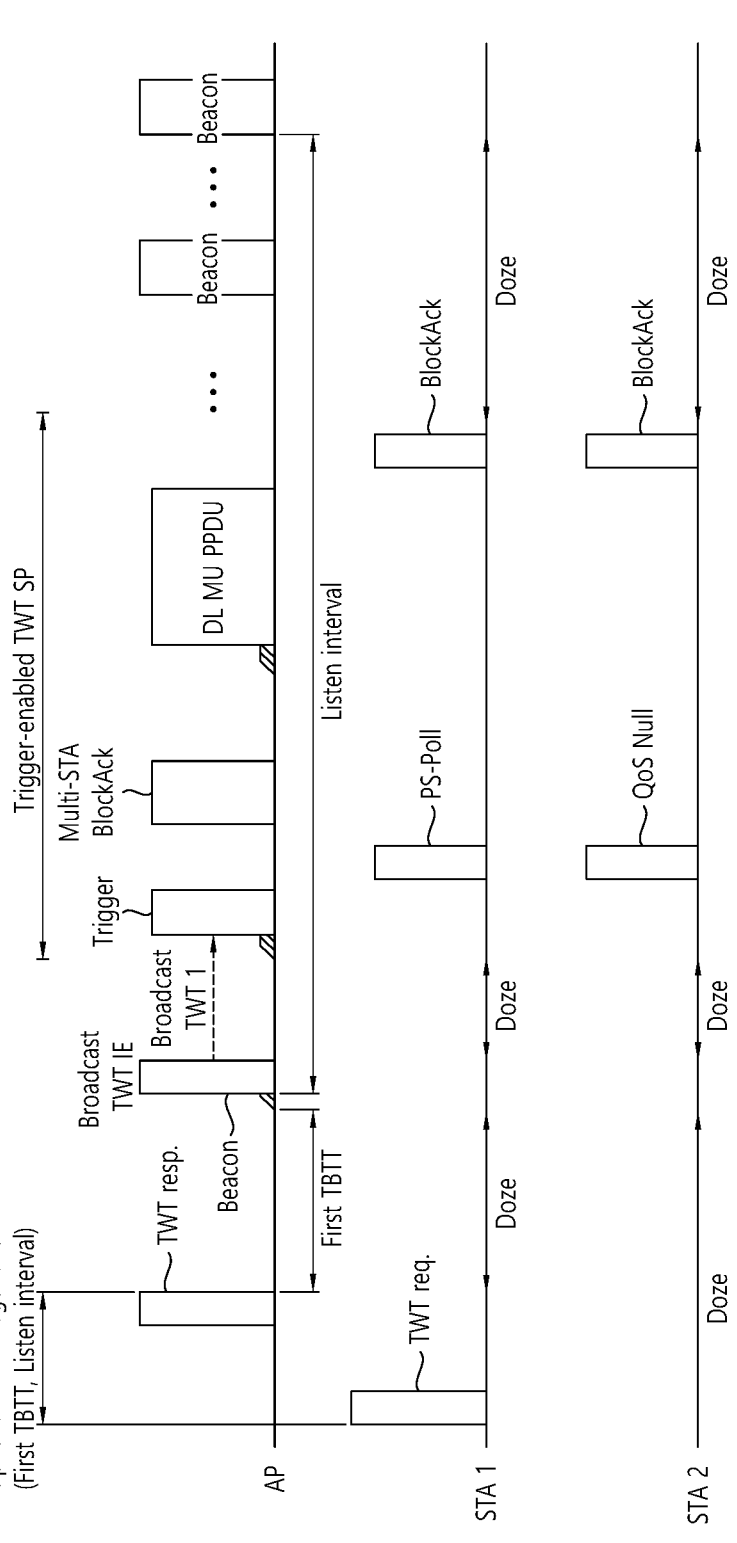
FIG. 13 shows an example of a broadcast TWT operation.

Hereinafter, TWT (Target Wake Time) will be described with reference to FIGS. 12 and 13. FIG. 12 shows an example of individual TWT operation. FIG. 13 shows an example of a broadcast TWT operation.

The TWT defines a Service Period (SP) between an AP and anon-AP STA and shares information about the SP to reduce media contention, thereby improving the energy efficiency of non-AP STAs in 11ax's PS (Power Saving) technology. An STA that performs Request/Suggest/Demand in the TWT setup step may be referred to as a TWT Requesting STA. In addition, an AP that responds to the request, such as accept/reject, may be referred to as a TWT responding STA. The setup step may include a process of determining/defining a TWT request from an STA to an AP, a type of a TWT operation to be performed, and a frame type to be transmitted and received. The TWT operation can be classified into an individual TWT and a broadcast TWT.

The individual TWT is a mechanism to perform data exchange, after the AP and the non-AP STA negotiate the wake/dozes status of the non-AP STA through transmission and reception of TWT Request/Response frames. FIG. 12 shows an example of the operation of an individual TWT. The AP and the STA1 may configure a trigger-enabled TWT agreement through the TWT request frame and the TWT response frame. At this time, the method used by the STA1 is a solicited TWT method. When the STA1 transmits a TWT request frame to the AP, the STA1 receives information for TWT operation from the AP through a TWT response frame. On the other hand, the STA2 performing the Unsolicited TWT scheme may receive information on trigger-enabled TWT agreement setting from the AP through an Unsolicited TWT response. Specifically, the STA2 may calculate the next TWT by adding a specific number from the current TWT value. During a trigger-enabled TWT SP, the AP may transmit a trigger frame to STAs. The trigger frame may inform the AP that there is buffered data. In this regard, the STA1 may inform the AP of its Awake state by transmitting a PS-Poll frame. In addition, the STA2 may inform the AP of its activated state by transmitting a QoS Null frame. At this time, the data frames transmitted by the STA1 and the STA2 may be frames in a TB PPDU format. After checking the states of the STA1 and the STA2, the AP may transmit a DL MU PPDU to activated STAs. When the corresponding TWT SP expires, the STA1 and the STA2 may switch to a doze state.

The broadcast TWT is a TWT method in which anon-AP STA (TWT Scheduling STA) transmits and receives TWT request/response frames with the AP (TWT Scheduled STA) to obtain information on TBTT (Target Beacon Transmission Time) and Listen Interval. At this time, a negotiation operation for TBTT may be performed. Based on this, the AP may define a frame including TWT scheduling information through a beacon frame. In FIG. 13, the STA 1 performs a requested TWT operation, and the STA2 performs a non-requested TWT operation. The AP may transmit the DL MU PPDU after checking the Awake state of the STAs through the trigger transmitted by the AP. This may be the same as the process of the individual TWT. Meanwhile, in the broadcast TWT, a Trigger-enabled SP including a beacon frame may be repeated several times at regular intervals.

Meanwhile, as an example, time delay in the present specification may mean delay/latency defined in IEEE 802.11ax. That is, the time delay in the present specification may mean the time 1) from when the corresponding frame enters the queue of the MAC layer of the transmitting STA, transmission of the transmitting STA in the PHY layer is successfully completed, and the transmitting STA receives an ACK/(Block ACK) from the receiving STA, 2) to until the corresponding frame is deleted from the queue of the MAC layer of the transmitting STA. In addition, in the present specification, a non-AP STA supporting transmission of latency sensitive data may be referred to as a low latency STA. In addition, a non-AP supporting transmission of data that is not latency-sensitive data, i.e., regular data, may be referred to as a regular STA.

Meanwhile, in the present specification, the latency-sensitive data may be data included in a predefined access category (AC). Also, in the present specification, the latency-sensitive data may be data to which a predefined traffic identifier (TID) is assigned. Also, in the present specification, the low-latency STA may be an STA that supports restricted TWT operation. In addition, in the present specification, a regular STA may be another STA that supports a restricted TWT operation, an STA that does not support a restricted TWT operation, or an STA that transmits during a restricted TWT SP of another STA.

Hereinafter, a restricted TWT operation will be described.

The restricted TWT is a technology in which a low-latency STA transmitting latency-sensitive data preferentially secures the transmission time of the corresponding data using broadcast TWT. That is, if a non-AP STA capable of transmitting the latency-sensitive traffic/data supports the restricted TWT, the STA can transmit/receive the latency-sensitive traffic/data within a restricted TWT SP allocated from an associated AP.

The low-latency STA may inform the AP that it supports the restricted TWT of the broadcast TWT and should transmit data based on this. If the AP supports the restricted TWT, the AP may transmit a beacon including scheduling information of TWTs requested by each STA to the low-latency STA and the regular STA. In addition, a separate TXOP may proceed within the restricted TWT SP using (MU) RTS/CTS or CTS-to-self. At this time, if the TXOP of another STA proceeds before the low-latency STA's protected TWT SP (e.g., restricted TWT SP set to the low-latency STA) starts, the TXOP may be terminated. In addition, the TXOP may additionally proceed after the TWT SP protected by the low-latency STA ends.

The restricted TWT is a new technology for low latency applied to 802.11be broadcast TWT. In the broadcast TWT of 802.11ax, there is no TWT protection function using the NAV protection technology of individual TWTs. To this end, a space/resource reserved in the Request Type field format of the Broadcast TWT Parameter Set field may be used to indicate whether restricted TWT is supported.

What the TWT protection of the individual TWT and the restricted TWT of the broadcast TWT have in common is the use of NAV protection mechanisms such as (MU) RTS/CTS or CTS-to-self frames when activated. However, in the case of the individual TWT, since the STA performing the TWT operation has to wait until the previous STA's transmission is completed, the STA may not be able to grasp the start time of the corresponding SP. Therefore, a transmission delay problem may occur. In addition, since the STA cannot predict a transmission time point, a transmission delay problem may be further aggravated when latency-sensitive data is transmitted. In the case of the broadcast TWT, the NAV protection mechanism that secures the TXOP within the TWT SP of an individual TWT is used as it is, but the previous transmission can be stopped/terminated by increasing a transmission priority of the restricted TWT. Through this, the low-latency STA can predict the transmission scheduling of the protected TWT SP that has not been secured in the individual TWT.

In 802.11be, a technique for supporting the operation mode of the aforementioned restricted TWT is proposed. Specifically, EHT non-AP STAs that support the announced restricted TWT SPs and are associated with the AP announcing the restricted TWT SP at the same time may end/terminate their TXOP before the start time of the corresponding restricted TWT SP. Therefore, a more predictable low-latency service can be provided for latency-sensitive traffic/data.

However, when data transmitted by a regular STA other than a low-latency STA is data that needs to be transmitted more quickly/urgently than latency-sensitive data transmitted by the low-latency STA, that is, data more delay-sensitive than the latency-sensitive data (e.g., data transmitted in an emergency situation, data having a relatively higher priority, etc.), the regular STA may terminal/stop/end its TXOP before the start time of the restricted TWT SP. Accordingly, a problem in that relatively more delay-sensitive data may be transmitted late or not transmitted may occur. Therefore, the present specification proposes a conditional execution method for restricted TWT operation.

For example, an EHT non-AP STA supporting restricted TWT SPs announced by the AP and at the same time associated with the corresponding AP announcing the restricted TWT SP can terminate/end/stop its TXOP before the start time of the restricted TWT SP. However, the termination operation may be performed only when the data transmitted by the corresponding STA during the corresponding TXOP is not data to be transmitted more urgently than latency-sensitive data. The EHT non-AP STA may perform a corresponding operation (i.e., an operation of terminating the TXOP) only when a specific condition is satisfied. Examples of the above specific conditions are as follows.

For example, when data transmitted by a regular STA during the TXOP is not data for one of TIDs (Traffic Identifiers) classified as latency traffic, the regular STA may terminate the TXOP and stop corresponding data transmission. That is, when data transmitted during the TXOP is data for one of TIDs classified as latency traffic, the corresponding STA may continue to transmit the corresponding data without terminating the TXOP.

As another example, if the data transmitted by the regular STA during TXOP is traffic having a lower priority than the latency traffic specified in the restricted TWT SP (i.e., data that needs to be transmitted more urgently than the latency-sensitive data), the regular STA may terminate TXOP and stop corresponding data transmission. That is, if data transmitted during TXOP is traffic having a higher priority than the latency traffic specified in the restricted TWT SP or traffic having the same priority, the STA does not terminate the TXOP, and continues to transmit the corresponding data.

As another example, if data transmitted during the TXOP belongs to a specific Access Category (e.g., AC_BE or AC_BK), for example, if the data is AC_VO or AC_VI, the data may be contiguously transmitted without terminating the TXOP. In addition, if the transmitted data is AC_BE or AC_BK, TXOP can be terminated before the restricted TWT SP. The aforementioned AC is an example, and the present specification is not limited thereto. For example, for AC_VI traffic, the STA may terminate the TXOP.

In other words, before the start time of the restricted TWT SP configured for the low-latency STA, the STA may terminate the obtained TXOP and stop transmitting data. However, if the data transmitted by the low-latency STA during the restricted TWT SP has a lower priority than the data transmitted by the STA, or the TID or AC of the data transmitted by the STA is a predetermined TID or a predetermined AC, the STA may not stop transmitting the data even after the restricted TWT SP interval starts.

Meanwhile, the AP may inform the terminal/STA of the information on the above condition using one or more of the methods described below.

Figure 14:
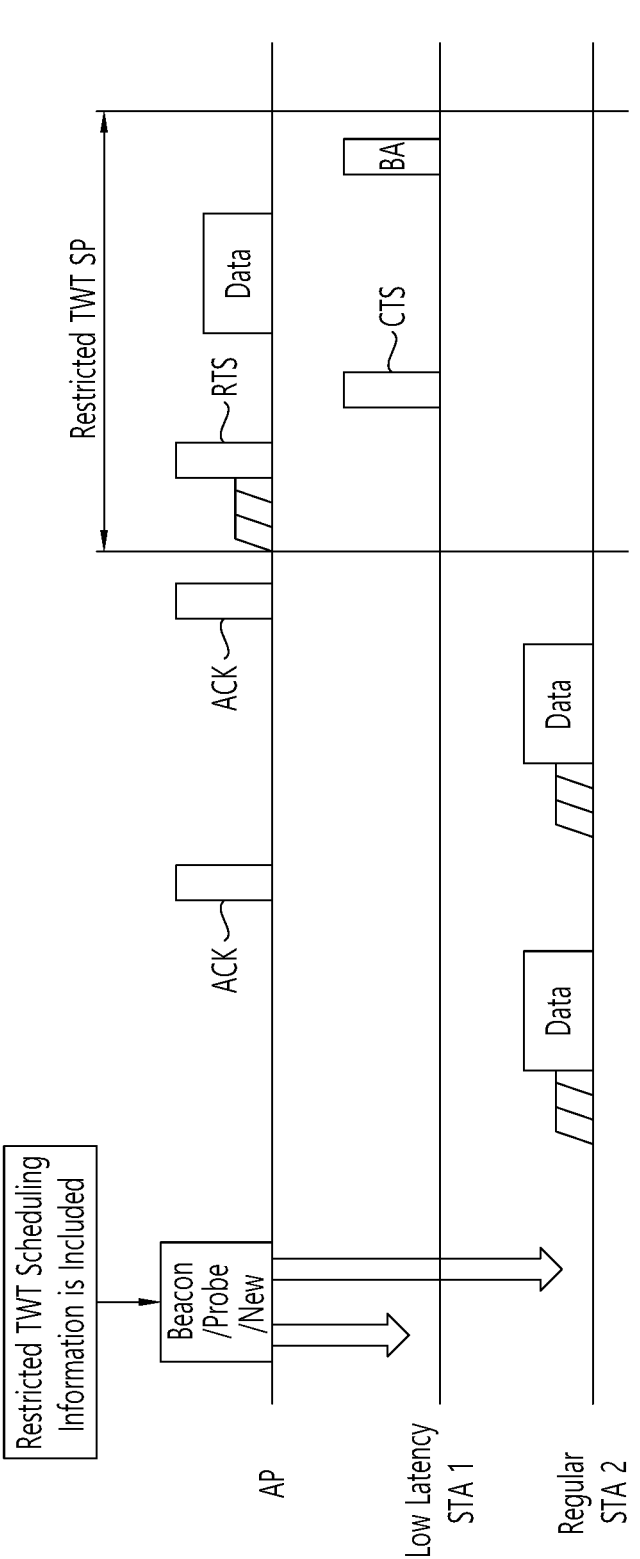
FIG. 14 shows an example of a restricted TWT operation proposed in the present specification.

As an example, an unsolicited method may be considered. That is, a beacon, (broadcast) probe response, and another (/new) announcement (/broadcast) frame may be used. The AP may transmit the frame by including corresponding condition information. FIG. 14 shows an example of a restricted TWT operation proposed in the present specification.

Referring to FIG. 14, the AP transmits a signal including restricted TWT scheduling information. The signal may be a beacon frame, a probe response or a new frame.

In FIG. 14, it is assumed that the STAT receiving the signal transmitted by the AP is a low-latency STA, and the STA2 receiving the signal transmitted by the AP is a regular STA. At this time, the regular STA2 may obtain TXOP after performing a backoff operation. When the regular STA2 obtains the TXOP, the regular STA2 may transmit data to the AP. Upon receiving the data, the AP may transmit an ACK signal to the regular STA2. Thereafter, during the restricted TWT SP, the AP may transmit an RTS. In response to the RTS, low-latency STAT may transmit a CTS. Then, the AP transmits data to the low-latency STAT, the low-latency STAT may transmit a block ACK (BA).

Figure 15:
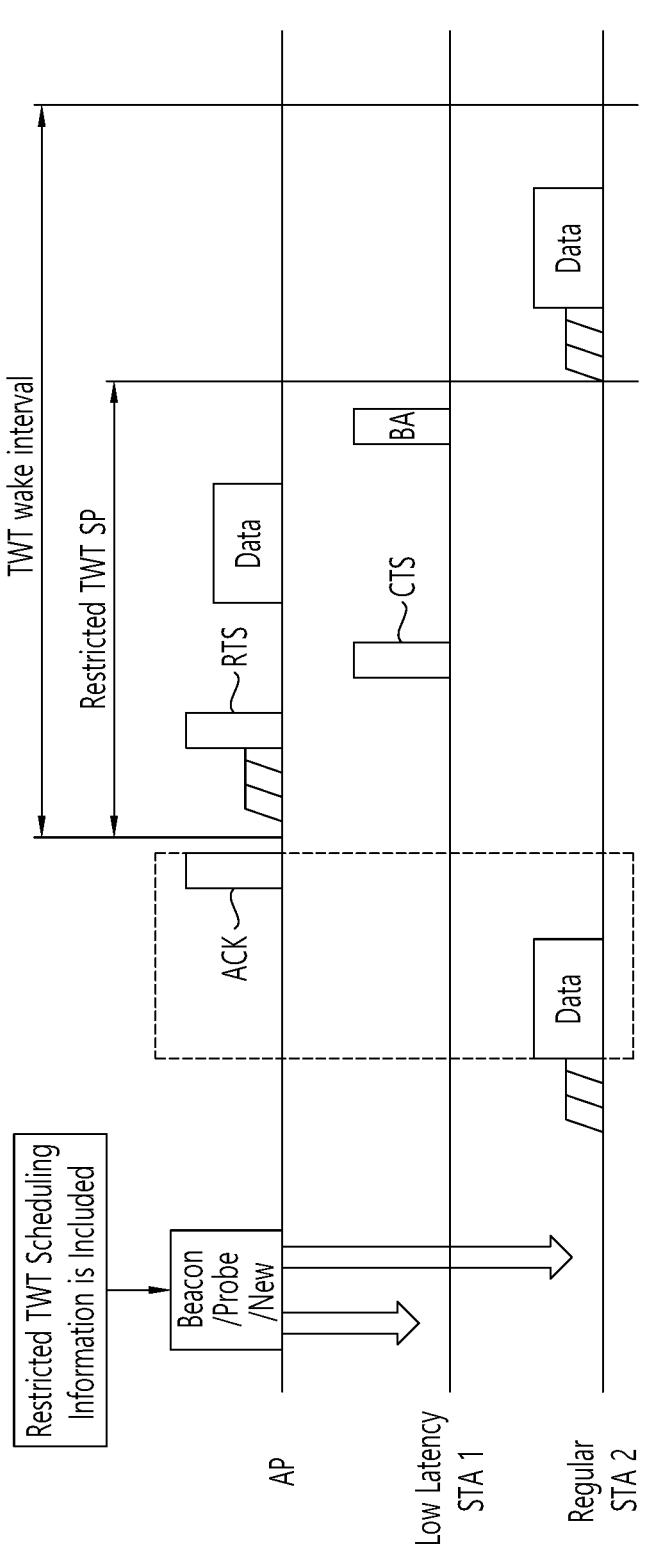
FIG. 15 shows another example of a restricted TWT operation proposed in the present specification.

FIG. 15 shows another example of a restricted TWT operation proposed in the present specification. FIG. 15 may be related to a case in which data transmitted by a low-latency STAT is more urgent than the data transmitted by the regular STA2 in the example of FIG. 14. For example, FIG. 15 may be an example of a case where the priority of data transmitted by low-latency STAT is higher than the priority of data transmitted by regular STA2. That is, the example of FIG. 14 may be an example of a case in which the data transmitted by the regular STA2 is more urgent than the data transmitted by the low-latency STA1.

Referring to FIG. 15, the AP transmits a signal including restricted TWT scheduling information. The signal may be a beacon frame, a probe response or a new frame.

As in FIG. 14, the regular STA2 performs a backoff operation and obtains a TXOP to transmit data to the AP. Upon receiving the data, the AP may transmit an ACK signal to the regular STA2. Here, unlike in FIG. 14, after the restricted TWT SP ends, the regular STA2 may transmit data not transmitted during the restricted TWT SP after the restricted TWT SP ends and within the TWT wake interval.

Figure 16:
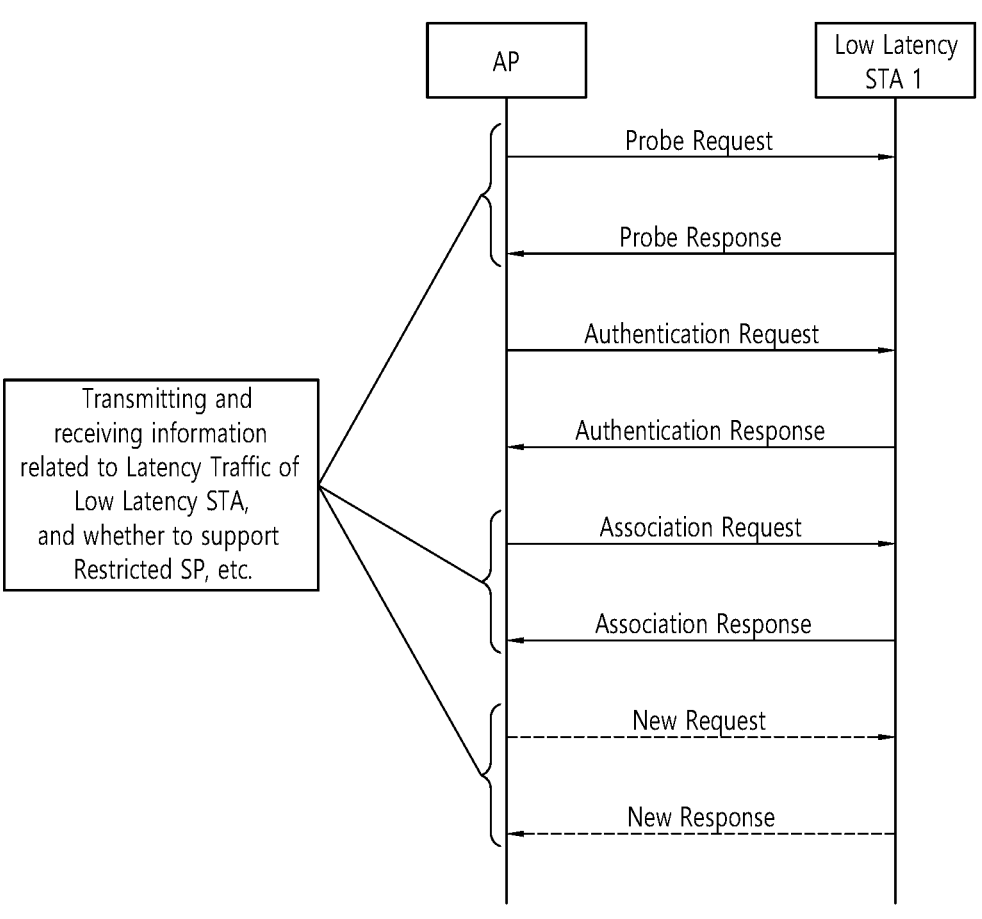
FIG. 16 shows an example of a negotiation procedure.

Meanwhile, the AP may transmit corresponding condition information to the UE/STA through a negotiation procedure (e.g., exchanging Probe Request/Response, Association Request/Response, and New Request/Response, etc.). FIG. 16 shows an example of a negotiation procedure.

Referring to FIG. 16, the AP may transmit a probe request to the low-latency STAT, and the low-latency STAT may transmit a probe response to the AP in response to the probe request. In addition, the AP may transmit an Authentication Request to the low-latency STAT, and the low-latency STA1 may transmit an Authentication Response to the AP in response to the authentication request. In addition, the AP may transmit an Association Request to the low-latency STA1, and the low-latency STA1 may transmit an Association Response to the AP in response to the association request. Here, the probe request, probe response, association request and/or association response may be a signal including information about latency traffic of the low-latency STA and information such as whether or not the restricted TWT SP is supported.

In addition, the AP may transmit a New Request to the low-latency STA1, and the low-latency STA1 may transmit a New Response to the AP in response to the new request. Here, the new request and new response may be a signal including information about latency traffic of the low-latency STA and information such as whether or not the restricted TWT SP is supported.

The AP/STA may transmit through a signal transmitted/received in the negotiation procedure including information such as detailed information (e.g., real-time gaming, cloud gaming, real-time video, robots and industrial automation (Robotic and industrial automation), etc.) on latency traffic and whether or not each AP/STA supports a restricted TWT SP. Through this, the AP and the low-latency STA can set an optimal environment for latency-sensitive traffic/signals to be transmitted. Transmission and reception of corresponding information may be performed through one or more of the examples described later.

For example, the information delivery may be completed through a Request & Response once during the negotiation process. As another example, transmission and reception of corresponding information may be performed through a probe request and response and an Association request/response. As another example, transmission and reception of the information may be performed through a separate new request and response procedure for transmitting information about the low-latency STA.

As described above, according to the above method/conditions, STAs/terminals may not terminate the currently ongoing TXOP before the start of the restricted TWT SP. Additional restrictions may be added here. For example, only when the corresponding restricted TWT SP is set to inter-BSS, STAs/terminals can continue to transmit and receive data without terminating the TXOP. For example, the additional restriction may be applied only when data transmitted during the TXOP is data for one of TIDs classified as latency traffic, or when traffic or data transmitted during the TXOP has a higher priority than latency traffic specified in the restricted TWT SP (or when the traffic or data is AC_VO or AC_VI). If it is configured by intra-BSS, or if the data transmitted during TXOP is AC_VO or AC_VI, traffic or data having a higher priority than the latency traffic specified in the restricted TWT SP, STAs/terminal can continue transmitting and receiving without terminating the TXOP before starting the restricted TWT SP.

In the example of the above-described restricted TWT operation, it is assumed that an association between the AP, regular STA, and low-latency STA is established. In order for the restricted TWT operation of the low-latency STA to be performed first, the TXOP of the regular STA in progress may be temporarily suspended. If there is no regular STA, that is, in an association between the AP, low-latency STA1 and low-latency STA2, the restricted TWT operation may be performed based on scheduling of the AP without considering the priority between the two STAs.

Hereinafter, a method for determining whether to maintain the TXOP of a non-AP STA will be described.

Based on the rules/methods described later (in the restricted TWT SP (at the time of starting) window) that a non-AP STA that transmits data before the start of the restricted TWT SP, a method/technique for determining whether or not to maintain its own TXOP is proposed. As a result, the non-AP STA may determine whether to postpone/delay the starting time/point of the restricted TWT SP.

Existing Wi-Fi standards define TID as 4 bits, and EDCA defines that TID values from 0 to 7. Values from 8 to 15 are defined to be used for HCCA, SPCA, HEMM, and SEMM, but 802.11ax defines corresponding values as unused values (Reserved). In a next-generation wireless LAN system, a method for distinguishing latency-sensitive data/traffic from data of other ACs using TID values from 8 to 15 of 802.11ax, and a method for classifying latency-sensitive data/traffic by transmission priority of data/traffic type may be considered. Based on this (in the restricted TWT SP window), the non-AP STA may independently determine whether to postpone/delay the start time of the restricted TWT SP by maintaining its TXOP for continuous transmission of its own data or whether to allow scheduled latency-sensitive data/traffic to be transmitted by terminating its own TXOP before the restricted TWT SP.

The corresponding method can be performed when the non-AP STA knows both information about the TID of its data transmitted before the restricted TWT SP as well as information about the TID of latency-sensitive data to be transmitted within the restricted TWT SP. Information on the TID of latency-sensitive data to be transmitted within the restricted TWT SP may be included in a beacon that announces restricted TWT scheduling information from an AP previously associated with it.

Based on the TID information of each data, it is possible to determine the degree of transmission priority between data. In the present specification, it is assumed that the higher the TID value is, the higher the data transmission priority is, and the smaller the TID value is, the lower the data transmission priority is assumed.

A non-AP STA that was transmitting data before the restricted TWT SP may determine whether to maintain its TXOP by comparing TID values of data with each other based on the following criteria.

For example, if the TID of data in progress before the restricted TWT SP is greater than or equal to the TID of data to be transmitted within the restricted TWT SP, a non-AP STA that was transmitting data before the restricted TWT SP may postpone the starting point of the restricted TWT SP in order to continue transmitting data without terminating its TXOP.

As another example, if the TID of data in progress before the restricted TWT SP is lower/less than the TID of data scheduled to be transmitted within the restricted TWT SP, the non-AP STA that was transmitting data before the restricted TWT SP may not postpone/delay the start time of the restricted TWT SP by terminating its own TXOP.

Additionally, the TWT responding STA (or STA/AP scheduling the TWT) may announce to the TWT requesting STA (or STA/non-AP STA for which the TWT is scheduled) whether the delay/postponement of the restricted TWT SP is allowed/supported based on the operation of the non-AP STA described above. As described above, the start point/time of the restricted TWT SP may be delayed in the time domain depending on whether the non-AP STA, which was transmitting data before the restricted TWT SP, terminates its TXOP before the restricted TWT SP based on the TID. Due to the influence of the above-described operation, information on whether or not to allow the delay/postponement of the starting point/time of the restricted TWT SP later in the time domain may be announced to the TWT requesting STA by the TWT responding STA. In the present specification, corresponding information is referred to as TID Allowance, and the corresponding information may have a size of 1 bit.

For example, when the value of TID Allowance is one (1), the start point/time of the restricted TWT SP may be changed, according to the result of the non-AP STA transmitting data before the restricted TWT SP comparing data based on the TID of the data. Therefore, only when the value of TID Allowance is one (1), even if the restricted TWT SP starts, STA/terminal can continue to transmit data currently being transmitted based on the TID without stopping the transmission. For example, if the STA's currently transmitted/in-progress data has a higher priority than the traffic allocated to the restricted TWT SP, the STA may continue to transmit the currently transmitted/ongoing data. Alternatively, if the TID of the currently transmitted/in-progress data has a higher value than the TID of the traffic allocated to the restricted TWT SP, the STA may continue to transmit the currently transmitted/in-progress data.

For example, when the value of TID Allowance is zero (0), a change in the starting point of the restricted TWT SP may not be allowed based on the result of comparing data based on the TID of the transmitting non-AP STA prior to the restricted TWT SP.

The TID Allowance information may be transmitted to a non-AP STA (TWT responding STA/TWT scheduled STA) by an AP (TWT responding STA/TWT scheduling STA) using one or more of the methods described below.

Method 1) The TID Allowance information may be included in the TWT response frame transmitted and received during the TWT setup procedure.

Method 2) When transmitting a beacon frame, probe response frame, or association response frame, the TID Allowance information may be included in a capability field (EHT Capability field/EHT MAC Capability field) of each frame.

Figure 17:
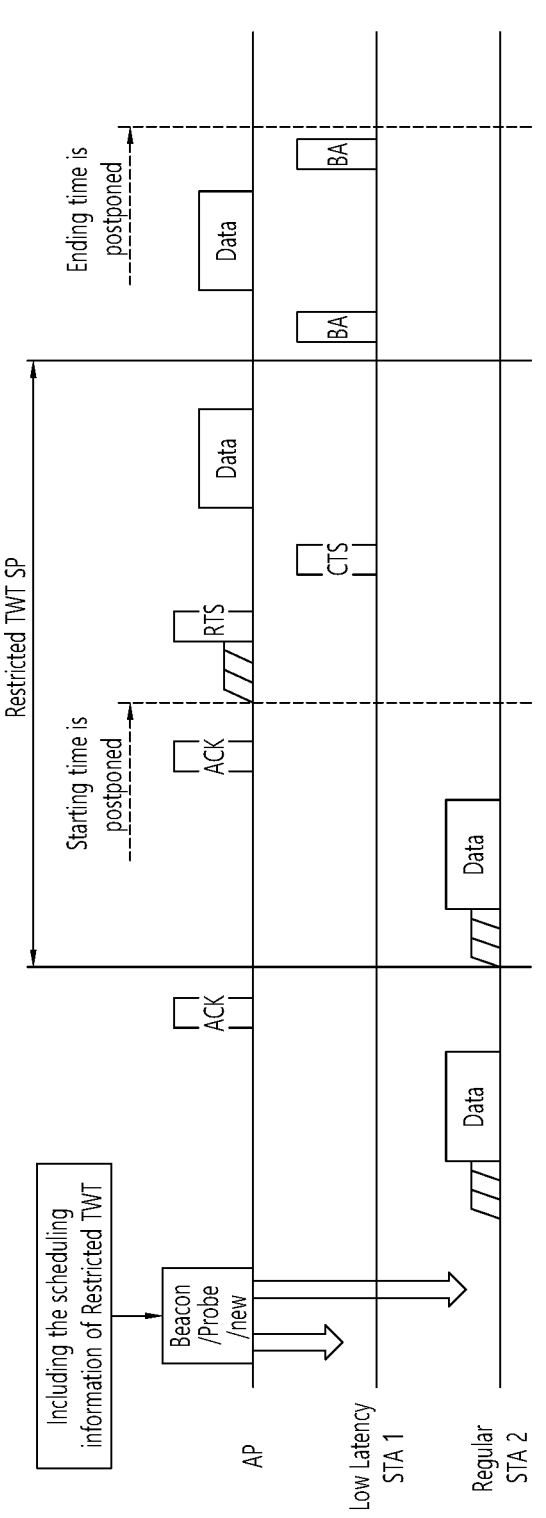
FIG. 17 shows an example of postpone at the start time and end time of the restricted TWT SP.

Meanwhile, the SP of the restricted TWT of FIG. 14 described above may start later in the time domain than the SP of the restricted TWT of FIG. 15. Referring to FIG. 14, transmitted/in-progress data may exist before the SP of the restricted TWT. Here, the corresponding data may be data that does not satisfy the conditions proposed in the present specification. On the other hand, referring to FIG. 15, data being transmitted/in progress prior to the SP of the restricted TWT may be data that satisfies the conditions presented in the present specification. That is, the example of FIG. 15 may be an example of a case where the STA transmitting the data has terminated its TXOP. Therefore, the start point of the SP of the restricted TWT of FIG. 14 may be located/positioned behind the start point/time of the SP of the restricted TWT of FIG. 15 in the time domain. When the EHT non-AP STA does not stop its TXOP as shown in FIG. 17 according to the conditions proposed in the present specification, the start point/time of the SP of the restricted TWT may be pushed back in the time domain by the data transmitted by the STA. FIG. 17 shows an example of postpone at the start time and end time of the restricted TWT SP.

Referring to FIG. 17, the AP transmits a signal including restricted TWT scheduling information. The signal may be a beacon frame, a probe response or a new frame.

In FIG. 17, it is assumed that the STAT receiving the signal transmitted by the AP is a low-latency STA, and the STA2 receiving the signal transmitted by the AP is a regular STA. At this time, the regular STA2 may transmit data to the AP by obtaining a TXOP after performing a backoff operation. Upon receiving the data, the AP may transmit an ACK signal to the regular STA2.

The regular STA2 may determine whether to postpone the restricted TWT SP according to various methods/embodiments proposed in the present specification. For example, when data transmitted by the regular STA2 has higher transmission priority than data transmitted during the restricted TWT SP, the regular STA2 may postpone/delay the restricted TWT SP.

Figure 18:
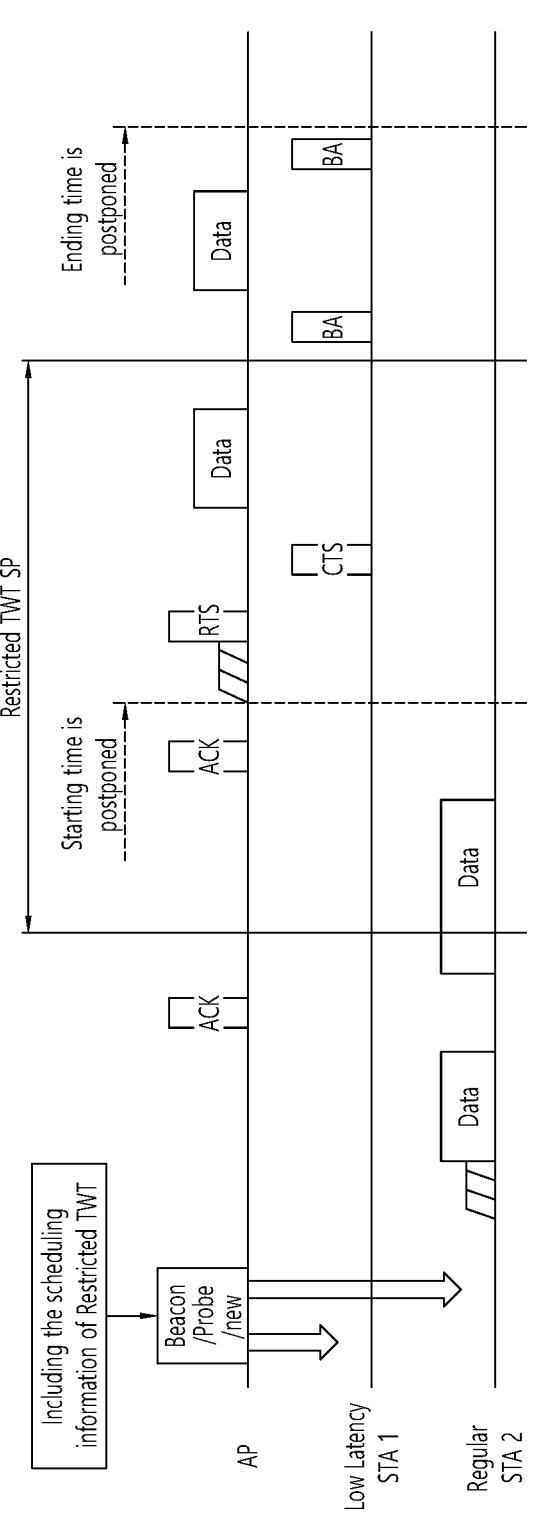
FIG. 18 illustrates another example of postpone at the start time and end time of the restricted TWT SP.

FIG. 18 illustrates another example of postpone at the start time and end time of the restricted TWT SP.

Referring to FIG. 18, the AP transmits a signal including restricted TWT scheduling information. The signal may be a beacon frame, a probe response or a new frame.

In FIG. 18, it is assumed that the STAT receiving the signal transmitted by the AP is a low-latency STA, and the STA2 receiving the signal transmitted by the AP is a regular STA. At this time, the regular STA2 may transmit data to the AP by obtaining a TXOP after performing a backoff operation. Upon receiving the data, the AP may transmit an ACK signal to the regular STA2.

Referring to FIG. 18, after receiving the signal from the AP, the regular STA2 may perform a backoff operation to obtain a TXOP. Thereafter, the regular STA2 may transmit data to the AP and receive an ACK for the data from the AP. Thereafter, the regular STA2 may continuously transmit data to the AP. Here, as shown in FIG. 17, the regular STA2 may transmit data after performing the backoff operation again. Alternatively, as shown in FIG. 18, the regular STA2 may continuously transmit data without performing a backoff operation.

The regular STA2 may determine whether to postpone the restricted TWT SP according to various methods/embodiments proposed in the present specification. For example, when data transmitted by the regular STA2 has higher transmission priority than data transmitted during the restricted TWT SP, the regular STA2 may postpone/delay the restricted TWT SP.

Meanwhile, in FIGS. 17 and 18, when the restricted TWT SP is delayed/postponed, the AP may transmit a signal including information related to the delay/postponement (e.g., whether to postpone, the delayed time at the start of the restricted TWT SP, the delayed time at the end of the restricted TWT SP, etc.) of the restricted TWT SP to the STAs. STAs receiving the signal can determine that the restricted TWT SP has been delayed/postponed through the signal.

Alternatively, even if there is no explicit signaling of the signal, the AP may indirectly/implicitly inform the STAs that the restricted TWT SP is postponed/delayed by setting a quiet interval. Alternatively, it may indirectly/implicitly inform that the restricted TWT SP has been postponed/delayed through a more data subfield of the PPDU including data transmitted by the regular STA. For example, if the additional data subfield of the PPDU containing the data transmitted by the regular STA indicates that transmission of data has not ended/terminated (e.g., the additional data subfield indicates '1'), the low-latency STA may not perform a transmission/reception operation even after the start time of the set restricted TWT SP arrives. Thereafter, when the additional data subfield of the PPDU containing the data transmitted by the regular STA indicates that transmission of data is terminated (e.g., the additional data subfield indicates 0), the low-latency STA transmits and receives can be performed.

According to the 802.11ax standard, related data can be exchanged only during the interval of the SP of the TWT secured by scheduling by the AP. That is, in the example of FIG. 14, the end point/time may have to be the same as the restricted TWT SP of FIG. 15 despite being pushed backward in the time domain at the start point/time of the restricted TWT SP due to data in progress before the restricted TWT SP. At this time, in the case of FIG. 14, data between the AP and the low-latency STA may not be sufficiently delivered. Therefore, as shown in FIG. 17 or 18, it may be considered that the end point/time of the restricted TWT SP is also pushed back by the interval of the corresponding SP in time according to the start time. Here, the STA transmits latency-sensitive traffic from the changed start point of the restricted TWT SP, and the total time until the transmission is completed may not exceed the initial interval of the corresponding SP. For example, as in the example of FIG. 17 or 18, if the delayed/postponed start time of the restricted TWT SP is 'A ms', the end time may also be delayed/postponed until 'A ms'. Alternatively, the delayed/postponed time of the end point may be determined within a range that does not exceed the delayed/postponed time of the start time. For example, if the start time is delayed/postponed by 'A ms', the delayed/postponed end time may be set to a value smaller than 'A ms'. Through this, the initially secured section of the restricted TWT SP can be guaranteed, and latency-sensitive data between the AP and the low-latency STA can be completely delivered.

Here, the AP may perform scheduling between TWT SPs so that a TWT SP scheduled after the corresponding restricted TWT SP can be protected from the restricted TWT SP extended in the above-described manner. Therefore, when the end point of the currently ongoing restricted TWT SP is extended/postponed, the AP may perform scheduling so that the extended postponed restricted TWT SP does not overlap with individual/broadcast TWT SPs or other restricted TWT SPs scheduled thereafter. That is, transmission in the extended restricted TWT SP may not overlap with transmission (or TXOP) in the individual/broadcast TWT SP scheduled thereafter.

Hereinafter, examples of operations of STAs based on various methods/embodiments proposed in the present specification will be described. The examples described below do not limit the method/embodiment proposed herein.

If regular data transmitted by a non-AP STA is data that needs to be transmitted more urgently than latency-sensitive data, if the STA terminates the TXOP and performs a restricted TWT operation, collision between data may occur as a result. Therefore, the restricted TWT operation may be allowed only when the regular data transmits data that is relatively less urgent than latency-sensitive data.

Figure 19:
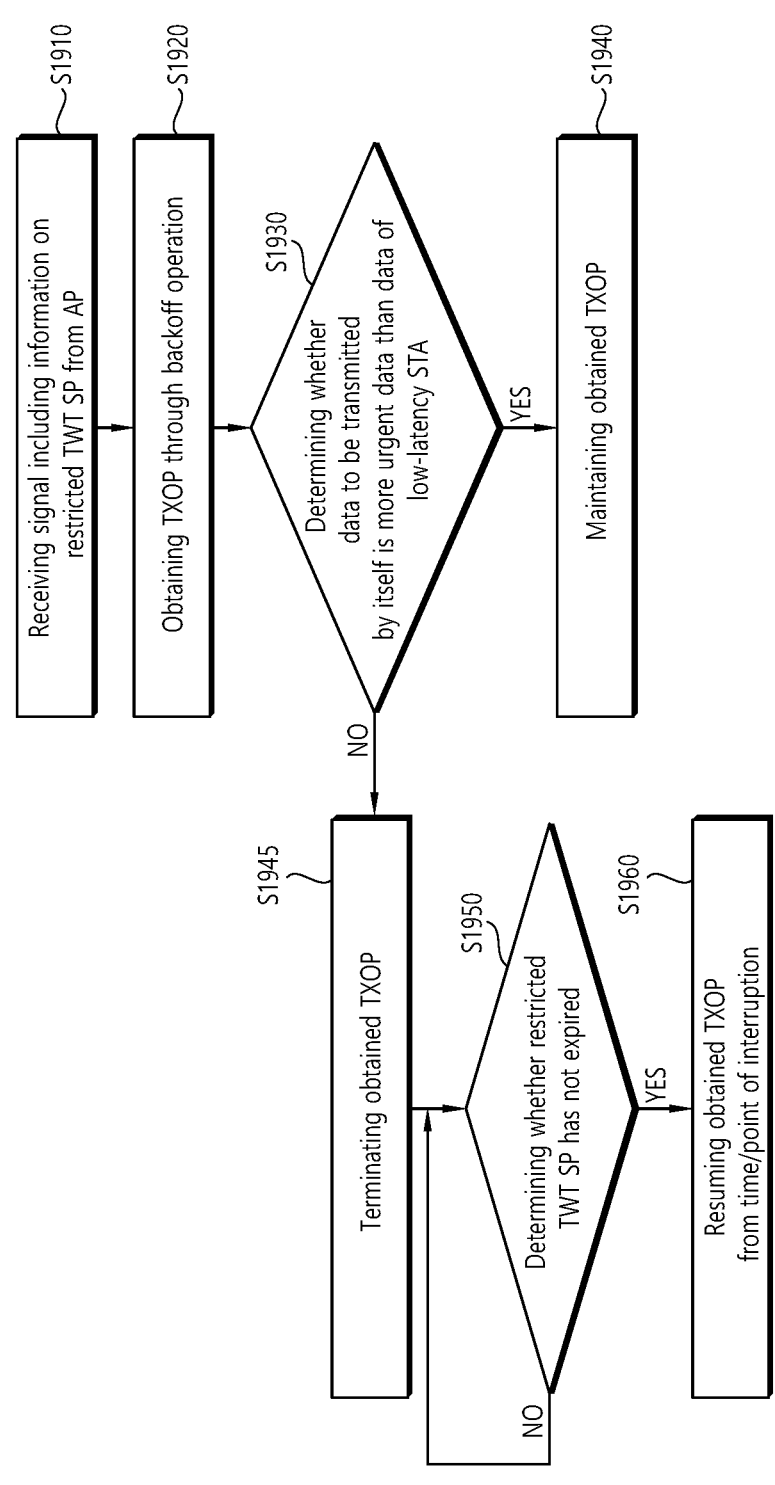
FIG. 19 is a flowchart of an example of a method of operating a regular STA according to some implementations of the present specification.

FIG. 19 is a flowchart of an example of a method of operating a regular STA according to some implementations of the present specification. Here, the regular STA may be a station (STA) unable to perform a restricted TWT operation or a STA for which a restricted TWT operation is not configured.

Referring to FIG. 19, the regular STA receives a signal including information on the restricted TWT SP from the AP (S1910). Here, the signal including information on the restricted TWT SP may be configured in a beacon frame format, a probe response frame format, or other frame formats. Thereafter, the regular STA obtains a TXOP through a backoff operation (S1920).

The regular STA determines whether the data to be transmitted by itself is more urgent data than the data of the low-latency STA (S1930). The determination may be performed based on priorities between data, a traffic identifier (TID), an access category (AC), and the like.

In step S1930, when the data to be transmitted by the regular STA is more urgent data than the data of the low-latency STA, the regular STA maintains the obtained TXOP (S1940). In step S1930, if the data of the low-latency STA is more urgent data than the data to be transmitted by the regular STA, the regular STA terminates the obtained TXOP (S1945). Thereafter, the regular STA determines whether the restricted TWT SP has expired (S1950). If the restricted TWT SP has not expired, it returns to step S1950. In other words, if the restricted TWT SP has not expired, the regular STA re-determines whether the restricted TWT SP has expired. When the restricted TWT SP expires, the regular STA resumes the obtained TXOP from the point of interruption (S1960). Here, when the restricted TWT SP expires, the regular STA may perform a backoff operation to obtain a new TXOP and then transmit data.

The foregoing example assumes that the AP is associated to a regular STA and a low-latency STA. Additionally, the present specification proposes a restricted TWT operation when there is no regular STA, that is, when the AP is associated to the low-latency STA1 and the low-latency STA2.

If the AP, low-latency STA1 and low-latency STA2 are located in the intra-BSS, the restricted TWT operation may be performed based on scheduling of the AP regardless of the priority between the two STAs. Hereinafter, an example of the operation of low-latency STA1 is described. After receiving the scheduling information of the restricted TWT of the corresponding STA from the AP, the low-latency STA1 may check whether there is a low-latency STA that has received restricted TWT scheduling from the AP before itself. If there is a first scheduled restricted TWT, the STA1 may wait until the SP of the first scheduled restricted TWT expires. If there is no restricted TWT scheduled first, the corresponding STA1 may immediately start its own restricted TWT SP and transmit latency-sensitive data.

Figure 20:
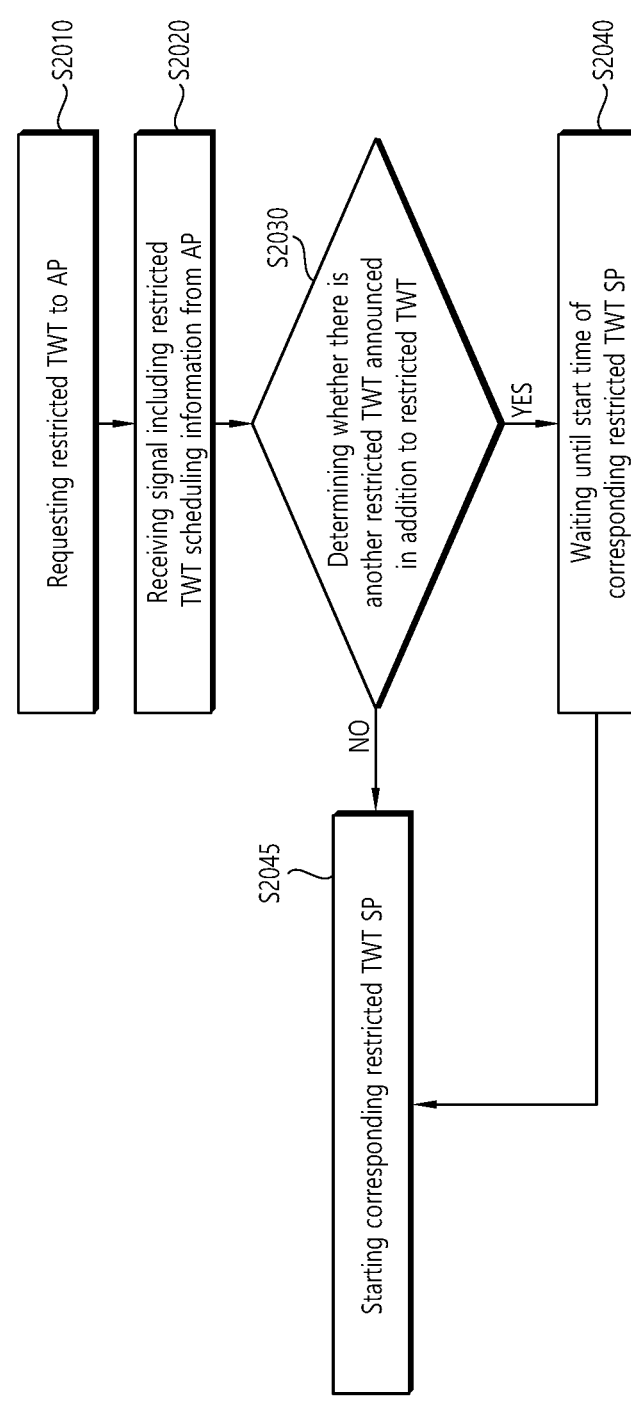
FIG. 20 is a flow chart for an example of an operating method of the low-latency STA1 according to some implementations of the present specification when the AP is associated with the low-latency STA1 and low-latency STA2.

FIG. 20 is a flow chart for an example of an operating method of the low-latency STA1 according to some implementations of the present specification when the AP is associated with the low-latency STA1 and low-latency STA2. An example of FIG. 20 may be an example in which an AP, a low-latency STA1 and a low-latency STA2 are included in the intra-BSS.

Referring to FIG. 20, the low-latency STA1 requests a restricted TWT from the AP (S2010). In response to the request, the AP may transmit a signal including restricted TWT scheduling information. That is, the low-latency STA1 receives a signal including restricted TWT scheduling information from the AP (S2020). Here, the signal may be configured in a beacon frame format, a probe response frame format, or another frame format.

The low-latency STA1 first determines whether there is another restricted TWT announced in addition to the restricted TWT (S2030). Here, the restricted TWT may mean a restricted TWT scheduled for the low-latency STA1.

If there is another previously announced restricted TWT other than the corresponding restricted TWT, the low-latency STA1 waits until the start time of the corresponding restricted TWT SP (S2040). If there is no other previously announced restricted TWT other than the corresponding restricted TWT, the low-latency STA1 starts the corresponding restricted TWT SP (S2045). In addition, in step S2040, after the low-latency STA1 waits until the start of the restricted TWT SP, the low-latency STA1 may start the restricted TWT SP as in step S2045.

If the AP, the low-latency STA1 and the low-latency STA2 are located in the inter-BSS or OBSS, the operation of the restricted TWT of the low-latency STA1 may be performed regardless of the low-latency STA2. Therefore, when low-latency STAs are included in intra-BSS, the restricted TWT operation of the low-latency STA considers the transmission scheduling of the AP, but the restricted TWT operation of the low-latency STAs belonging to the inter-BSS or OBSS may not consider their own scheduling.

FIG. 21 is a flow chart for an example of an operating method of the low-latency STA1 according to some implementations of the present specification when the AP, low-latency STA1 and low-latency STA2 are located in inter-BSS or OBSS.

Referring to FIG. 21, the low-latency STA1 requests restricted TWT from the AP (S2110). In response to the request, the AP may transmit a signal including restricted TWT scheduling information. That is, low-latency STA1 receives a signal including restricted TWT scheduling information from the AP (S2120). Here, the signal may be configured in a beacon frame format, a probe response frame format, or another frame format.

The low-latency STA1 first determines whether there is another restricted TWT announced in addition to the restricted TWT (S2130). Here, the restricted TWT may mean a restricted TWT scheduled for the low-latency STA1.

If there is another previously announced restricted TWT other than the corresponding restricted TWT, the low-latency STA1 determines whether the previously announced restricted TWT is the restricted TWT of the STA belonging to the intra-BSS (S2140). If the previously announced restricted TWT is the restricted TWT of an STA belonging to intra-BSS, the low-latency STA1 waits until the start of the corresponding restricted TWT SP (S2150). Thereafter, the low-latency STA1 starts the corresponding restricted TWT SP (S2160).

Meanwhile, in step S2130, if there is no other previously announced restricted TWT other than the restricted TWT, the low-latency STA1 may start the corresponding restricted TWT SP. In addition, in step S2140, if the previously announced restricted TWT is not the restricted TWT of the STA belonging to the intra-BSS, the low-latency STA1 may start the corresponding restricted TWT SP.

Therefore, the following operation may be considered for the restricted TWT operation of the aforementioned low-latency STA. For example, in an intra-BSS environment, the restricted TWT of low-latency STAs may be performed based on the order scheduled by the AP without considering priority. As another example, the restricted TWT of low-latency STAs in inter-BSS and OBSS environments may not consider priority.

Figure 22:
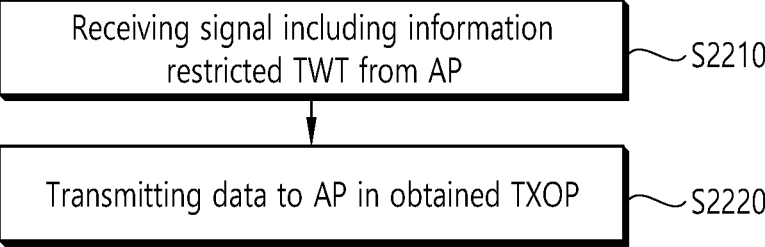
FIG. 22 is a flowchart of an example of a method of operation of an STA according to some implementations of the present specification.

Hereinafter, an operation of a communication device according to some implementations of the present specification will be described. FIG. 22 is a flowchart of an example of a method of operation of an STA according to some implementations of the present specification.

Referring to FIG. 22, the STA receives a signal including information for restricted TWT from the AP (S2210). Here, the signal may be configured in a beacon frame format, a probe response frame format, another frame format, or a newly defined frame format. In addition, the information for the restricted TWT may include at least one of the start time of the restricted TWT SP, end time of the restricted TWT SP, TID of latency-sensitive data transmitted/received from the restricted TWT SP, priority of latency-sensitive data transmitted/received from the restricted TWT SP, and/or AC(s) of latency-sensitive data transmitted/received from the restricted TWT SP.

The STA transmits data to the AP in the obtained TXOP (S2220). Here, based on the priority of the data being lower than the priority of the latency-sensitive data, the STA may terminate the TXOP before the start time of the restricted TWT SP. In other words, based on the priority of the data being lower than that of the latency-sensitive data, the STA may stop transmitting the data before the start time of the restricted TWT SP. In addition, based on the priority of the data being higher than the priority of the latency-sensitive data, the STA may maintain transmission of the data after the start of the restricted TWT SP.

Here, if the STA maintains transmission of the data after the start time of the restricted TWT SP, the start time of the restricted TWT SP may be postponed/delayed by a first time. In other words, if the STA maintains transmission of the data after the start time of the restricted TWT SP, the restricted TWT SP may start a first time after the start time of the restricted TWT SP. The first time may be a time interval from the start time of the restricted TWT SP to the time when the STA ends transmission of the data or a predetermined time interval. At this time, the end point of the restricted TWT SP may be postponed/delayed by a second time. Here, the maximum value of the second time may be the first time. Also, the second time may be a predetermined time interval.

In addition, if the STA maintains transmission of the data after the start time of the restricted TWT SP, the latency-sensitive data may be transmitted by a specific STA after the start time of the restricted TWT SP is delayed. The specific STA may be an STA for which the restricted TWT SP is configured.

Figure 23:
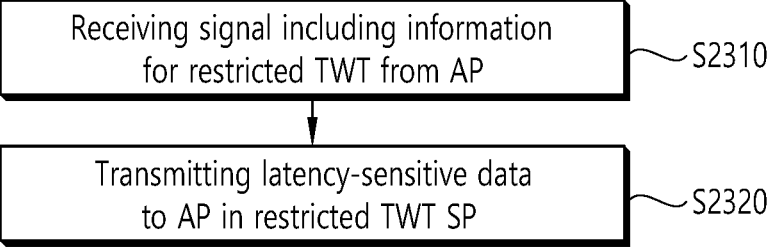
FIG. 23 is a flowchart of an example of an operation method of a specific STA in the example of FIG. 22.

FIG. 23 is a flowchart of an example of an operation method of a specific STA in the example of FIG. 22. The specific STA may be an STA performing a restricted TWT operation or an STA for which a restricted TWT SP is set.

Referring to FIG. 23, a specific STA receives a signal including information for restricted TWT from the AP (S2310). Here, the signal may be configured in a beacon frame format, a probe response frame format, another frame format, or a newly defined frame format. In addition, the information for the restricted TWT may include at least one of the start time of the restricted TWT SP, end time of the restricted TWT SP, TID of latency-sensitive data transmitted/received from the restricted TWT SP, priority of latency-sensitive data transmitted/received from the restricted TWT SP, and/or AC(s) of latency-sensitive data transmitted/received from the restricted TWT SP.

The specific STA transmits latency-sensitive data to the AP in the restricted TWT SP (S2320). Here, based on the priority of the latency-sensitive data being lower than the priority of data transmitted before the start time of the restricted TWT SP, the specific STA may transmit the latency-sensitive data after a first time elapses from the start time of the restricted TWT SP. That is, if the priority of the latency-sensitive data is lower than the priority of data transmitted before the start time of the restricted TWT SP, the start time of the restricted TWT SP may be postponed/delayed by the first time. In addition, the end point of the restricted TWT SP may be postponed/delayed by a second time. Here, the maximum value of the second time may be the first time. The first time and the second time may be the same as the first time and the second time described with reference to FIG. 22.

In addition, based on the priority of the latency-sensitive data being higher than the priority of data transmitted before the start of the restricted TWT SP, the specific STA may transmit the latency-sensitive data from the start of the restricted TWT SP. That is, if the priority of the latency-sensitive data is higher than the priority of data transmitted before the start time of the restricted TWT SP, the restricted TWT SP may not be postponed/delayed.

The example of FIG. 23 may be the same as the example of FIG. 17 or FIG. 18. In other words, the STA of FIG. 23 may be a regular STA of FIG. 17 or FIG. 18. In addition, the specific STA of FIG. 23 may be a low-latency STA of FIG. 17 or FIG. 18.

Figure 24:
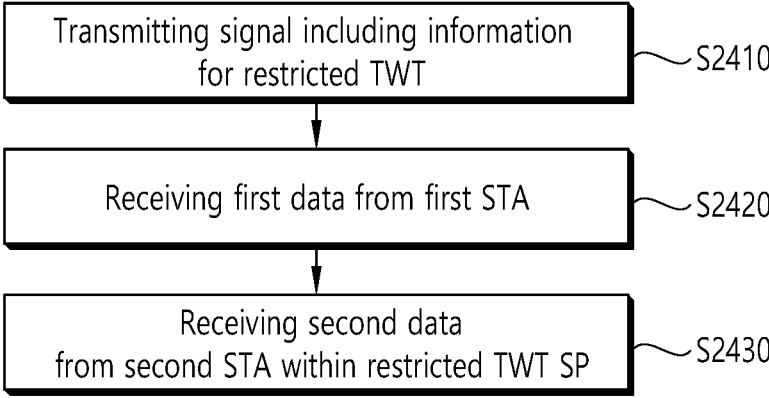
FIG. 24 is a flowchart of an example of a method of operating an AP according to some implementations of the present specification.

FIG. 24 is a flowchart of an example of a method of operating an AP according to some implementations of the present specification. In FIG. 24, an AP, a first STA, and a second STA may be included in an intra-BSS environment.

Referring to FIG. 24, an AP transmits a signal including information for restricted TWT from the AP (S2410). Here, the signal may be configured in a beacon frame format, a probe response frame format, another frame format, or a newly defined frame format. In addition, the information for the restricted TWT may include at least one of the start time of the restricted TWT SP, end time of the restricted TWT SP, TID of latency-sensitive data transmitted/received from the restricted TWT SP, priority of latency-sensitive data transmitted/received from the restricted TWT SP, and/or AC(s) of latency-sensitive data transmitted/received from the restricted TWT SP.

The AP receives first data from the first STA (S2420). Here, the first STA may be an STA for which the restricted TWT SP is not configured. In addition, the AP receives second data from the second STA within the restricted TWT SP (S2430). Here, the second STA may be an STA for which the restricted TWT SP is configured.

Here, based on the priority of the first data being higher than that of the second data, the first data may be transmitted from the start time of the restricted TWT SP until the first time elapses. In addition, based on the priority of the first data being higher than that of the second data, the second data may be transmitted after the first time elapses from the start of the restricted TWT SP. At this time, the second data may be transmitted from the end of the restricted TWT SP until the second time elapses. Here, the maximum value of the second time period may be the first time period.

In addition, based on the priority of the first data being lower than the priority of the second data, the AP may receive the first data until the start time of the restricted TWT SP. That is, if the priority of the first data is lower than that of the second data, the first data may not be transmitted after the start time of the restricted TWT SP.

The technical features of the present specification described above may be applied to various devices and methods. For example, the technical features of the present specification described above may be performed/supported through the device of FIGS. 1 and/or 11. For example, the technical features of the present specification described above may be applied only to a part of FIGS. 1 and/or 11. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 11.

Technical features of the present specification may be implemented based on a computer readable medium (CRM). For example, the CRM proposed by the present specification is at least one computer readable medium (CRM) containing instructions based on being executed by at least one processor.

The CRM may perform operations comprising: receiving, by the at least one processor, a signal including information for a restricted target wake time (TWT) from an access point (AP), wherein the information includes a restricted TWT service period (SP) and a priority of latency-sensitive data transmitted and received in the restricted TWT SP; and transmitting, by the at least one processor, data to the AP within an obtained transmission opportunity (TXOP), wherein based on a priority of the data being lower than the priority of the latency-sensitive data, the by the at least one processor terminates the TXOP before a start of the restricted TWT SP, wherein based on a priority of the data being higher than the priority of the latency-sensitive data, by the at least one processor maintains the transmission of the data after a start time of the restricted TWT SP. Instructions stored in the CRM of the present specification may be executed by at least one processor. At least one processor related to the CRM of the present specification may be the processors 111 and 121 or the processing chips 114 and 124 of FIG. 1 or the processor 610 of FIG. 11. Meanwhile, the CRM of the present specification may be the memories 112 and 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method in a wireless local area network (LAN) system, the method comprising:

receiving, by a station (STA), a management frame including information for a restricted target wake time (TWT) from an access point (AP), wherein the information includes a restricted TWT service period (SP) and a priority of latency-sensitive data transmitted and received in the restricted TWT SP; and transmitting, by the STA, a physical protocol data unit (PPDU) including data to the AP within an obtained transmission opportunity (TXOP), wherein the PPDU further includes a more data subfield, wherein based on a priority of the data being lower than the priority of the latency-sensitive data, the STA terminates the TXOP before a start of the restricted TWT SP, wherein based on a priority of the data being higher than the priority of the latency-sensitive data, the STA maintains the transmission of the data after a start time of the restricted TWT SP, and the more data subfield of the PPDU transmitted before the start time of the restricted TWT SP has a value of one (1).

2. The method of claim 1, wherein based on the STA maintaining the transmission of the data after the start time of the restricted TWT SP, the start time of the restricted TWT SP is postponed by a first time.

3. The method of claim 2, wherein the first time is a time interval from the start time of the restricted TWT SP to a time when the STA terminates the transmission of the data.

4. The method of claim 2, wherein based on the STA maintaining the transmission of the data after the start time of the restricted TWT SP, an end time of the restricted TWT SP is postponed by a second time.

5. The method of claim 4, wherein the second time is greater than or equal to zero (0) and less than or equal to the first time.

6. The method of claim 1, wherein the management frame includes at least one of a beacon frame format and/or a TWT response frame format.

7. The method of claim 1, wherein the priority is determined based on at least one of a traffic identifier (TID), an access category (AC), and/or a priority identifier.

8. The method of claim 1, wherein based on the priority of the data being lower than the priority of the latency-sensitive data, the more data subfield of the PPDU transmitted before the start time of the restricted TWT SP has a value of zero (0).

9. The method of claim 1, wherein the STA is included in a same basic service set (BSS) to which the AP and a specific STA transmitting/receiving the latency-sensitive data belong.

10. The method of claim 1, wherein the STA is a STA in which a restricted TWT operation is not set.

11. A station (STA) in a wireless local area network (LAN) system, the STA comprising;

a memory;

a transceiver; and a processor operatively coupled to the memory and the transceiver, wherein the processor is adapted to:

receive a management frame including information for a restricted target wake time (TWT) from an access point (AP), wherein the information includes a restricted TWT service period (SP) and a priority of latency-sensitive data transmitted and received in the restricted TWT SP; and transmit a physical protocol data unit (PPDU) including data to the AP within an obtained transmission opportunity (TXOP), wherein the PPDU further includes a more data subfield, wherein based on a priority of the data being lower than the priority of the latency-sensitive data, the processor terminates the TXOP before a start of the restricted TWT SP, wherein based on a priority of the data being higher than the priority of the latency-sensitive data, the processor maintains the transmission of the data after a start time of the restricted TWT SP, and the more data subfield of the PPDU transmitted before the start time of the restricted TWT SP has a value of one (1).

* * * * *